United States Patent
Sha et al.

(10) Patent No.: US 11,006,455 B2
(45) Date of Patent: May 11, 2021

(54) WIRELESS RESOURCE ALLOCATION METHOD AND APPARATUS

(71) Applicant: ZTE Corporation, Guangdong (CN)

(72) Inventors: Xiubin Sha, Guangdong (CN); Bo Dai, Guangdong (CN); Yuanfang Yu, Guangdong (CN); Ting Lu, Guangdong (CN); Qian Dai, Guangdong (CN); Jing Xu, Guangdong (CN)

(73) Assignee: ZTE CORPORATION, Shenzen (CN)

( * ) Notice: Subject to any disclaimer, the term of this patent is extended or adjusted under 35 U.S.C. 154(b) by 0 days.

(21) Appl. No.: 16/274,150

(22) Filed: Feb. 12, 2019

(65) Prior Publication Data

US 2019/0281632 A1 Sep. 12, 2019

Related U.S. Application Data

(63) Continuation of application No. PCT/CN2017/093386, filed on Jul. 18, 2017.

(30) Foreign Application Priority Data

Aug. 12, 2016 (CN) .......................... 201610670065.6
Nov. 3, 2016 (CN) .......................... 201610973984.0
Jan. 25, 2017 (CN) .......................... 201710064246.9

(51) Int. Cl.
*H04W 74/08* (2009.01)
*H04B 17/318* (2015.01)
*H04W 48/10* (2009.01)

(52) U.S. Cl.
CPC ...... *H04W 74/0833* (2013.01); *H04B 17/318* (2015.01); *H04W 48/10* (2013.01)

(58) Field of Classification Search
CPC ... H04W 74/08; H04W 17/318; H04W 48/10; H04W 74/0833; H04B 17/318
See application file for complete search history.

(56) References Cited

U.S. PATENT DOCUMENTS

| | | |
|---|---|---|
| 2002/0111166 A1 | 8/2002 | Monroe |
| 2004/0198369 A1* | 10/2004 | Kwak ................ H04W 52/262 455/452.2 |
| 2006/0251019 A1 | 11/2006 | Dalsgaard et al. |

(Continued)

FOREIGN PATENT DOCUMENTS

| | | |
|---|---|---|
| CN | 1753548 A | 3/2006 |
| CN | 101674613 A | 3/2010 |

(Continued)

OTHER PUBLICATIONS

Extended Search Report dated Mar. 13, 2020 for European Application No. 17838523.3, filed on Jul. 18, 2017 (16 pages).

(Continued)

*Primary Examiner* — Chi Ho A Lee
(74) *Attorney, Agent, or Firm* — Perkins Coie LLP

(57) ABSTRACT

Provided is a wireless resource configuration method and device. The wireless resource configuration method includes: broadcasting, by a base station, first access parameter information. The first access parameter information is configured based on a user equipment (UE) power class and is configured to enable the UE to select an access parameter according to the UE power class.

15 Claims, 15 Drawing Sheets

(56) References Cited

U.S. PATENT DOCUMENTS

| | | | |
|---|---|---|---|
| 2009/0046596 A1* | 2/2009 | Ewe | H04W 36/0033 370/252 |
| 2010/0113060 A1* | 5/2010 | Bai | H04W 16/14 455/453 |
| 2012/0207112 A1* | 8/2012 | Kim | H04W 52/365 370/329 |
| 2013/0182583 A1* | 7/2013 | Siomina | H04W 24/10 370/252 |
| 2013/0188610 A1 | 7/2013 | Fischer | |
| 2013/0223235 A1* | 8/2013 | Hu | H04W 48/20 370/242 |
| 2014/0162666 A1* | 6/2014 | Ratasuk | H04W 72/0453 455/450 |
| 2015/0016312 A1 | 1/2015 | Ying et al. | |
| 2016/0135193 A1* | 5/2016 | Zhang | H04W 52/04 370/329 |
| 2016/0183202 A1* | 6/2016 | Baldemair | H04W 24/10 455/522 |
| 2016/0219532 A1* | 7/2016 | Li | H04W 16/14 |
| 2016/0338109 A1* | 11/2016 | Rahman | H04W 56/005 |
| 2017/0013626 A1* | 1/2017 | Nan | H04L 1/1854 |
| 2017/0105127 A1 | 4/2017 | Xiong et al. | |
| 2017/0135149 A1* | 5/2017 | Shi | H04W 52/367 |
| 2017/0339648 A1* | 11/2017 | Wang | H04W 52/06 |
| 2019/0174434 A1* | 6/2019 | Koskinen | H04B 17/318 |

FOREIGN PATENT DOCUMENTS

| | | |
|---|---|---|
| CN | 105517182 A | 4/2016 |
| CN | 105636156 A | 6/2016 |
| EP | 2 334 124 A1 | 6/2011 |
| JP | 05-001373 B2 | 8/2012 |
| WO | 2013/067005 A1 | 5/2013 |
| WO | 2015/116870 A1 | 8/2015 |
| WO | 2016/121567 A1 | 8/2016 |

OTHER PUBLICATIONS

International Search Report and Written Opinion dated Sep. 29, 2017 for International Application No. PCT/CN2017/093386, filed on Jul. 18, 2017 (12 pages).

Chinese Search Report dated Jul. 13, 2018 for Chinese Application No. 201710064246.9, filed on Jan. 25, 2017 (4 pages).

Extended Search Report dated Sep. 28, 2020 for European Application No. 20170070.5, filed on Jul. 18, 2017 (6 pages).

Partial Supplementary European Search Report dated Dec. 11, 2019 for European Patent Application No. 17838523.3, filed on Jul. 18, 2017 (19 pages).

\* cited by examiner

WIRELESS RESOURCE ALLOCATION METHOD AND APPARATUS

CROSS REFERENCE TO RELATED APPLICATIONS

This patent document is a continuation of and claims priority to International Patent Application No. PCT/CN2017/093386, filed on Jul. 18, 2017, which claims the benefit of priority of Chinese Patent Application No. 201610670065.6, filed Aug. 12, 2016, and Chinese Patent Application No. 201610973984.0, filed Nov. 3, 2016, and Chinese Patent Application No. 201710064246.9, filed Jan. 25, 2017. The entire contents of the before-mentioned patent applications are incorporated by reference as part of the disclosure of this application.

TECHNICAL FIELD

The present disclosure relates to, but is not limited to, a field of wireless communications and, in particular, to a wireless resource configuration method and device.

BACKGROUND

Machine to Machine (M2M) communications are an important subject in 5th generation (5G) mobile communication technologies and an important application of wireless communications in the future. In the M2M communications, a research sub-topic of NarrowBand-Internet of Things (NB-IoT) has been proposed for a terminal featured with low costs and low throughput. That is, a low-throughput wireless communication service is provided for low-cost user equipment (UE) in the NB-IoT within a 200 kHz spectral bandwidth.

A series of parameters are configured for the conventional NB-IoT terminal to support communications of the NB-IoT terminal in a NB-IoT system. However, considering factors existing in the M2M application field of the NB-IoT, such as limitation to the shape of the battery (e.g., button battery) used in the terminal, and electric capacity of the terminal is limited. A such terminal has a low transmitting power and a poor uplink coverage, and can be called low power class UE. If parameters used for the conventional UE are still configured for the low power class UE, the low-power-class UE may not access the network or communicate normally.

Therefore, after the low power class UE is introduced in the NB-IoT system, how to configure corresponding wireless resources becomes an urgent problem to be solved in the NB-IoT system.

SUMMARY

The following is a summary of the subject matter described herein in detail. This summary is not intended to limit the scope of the claims.

Embodiments of the present disclosure provide a wireless resource configuration method and device. The information exchange between a base station and UE enables low power class UE to acquire a corresponding network parameter, and acquire a corresponding wireless resource for communication by the network parameter.

In a first aspect, the present disclosure provides a wireless resource configuration method, including:

a base station broadcasts first access parameter information, where the first access parameter information is configured based on a UE power class and is configured to enable the UE to select an access parameter according to the UE power class.

In a second aspect, the present disclosure provides a wireless resource configuration method, including:

UE receives first access parameter information broadcast transmitted by a base station, where the first access parameter information is configured based on a UE power class; and the UE selects in the first access parameter information an access parameter corresponding to the UE power class of the UE.

In a third aspect, the present disclosure provides a wireless resource configuration method, including:

a base station transmits second access parameter information to UE. The second access parameter information includes a parameter for enabling the UE to determine a wireless coverage level and is configured to enable the UE to determine the wireless coverage level according to a UE power class.

In a fourth aspect, the present disclosure provides a wireless resource configuration method, including:

UE receives second access parameter information transmitted by a base station, where the second access parameter information includes a parameter for enabling the UE to determine a wireless coverage level;

the UE determines the wireless coverage level of the UE according to the UE power class of the UE and the second access parameter information.

the UE determines a resource used for a physical random access channel (PRACH) according to the wireless coverage level.

In a fifth aspect, the present disclosure provides a wireless resource configuration method, including:

a base station broadcasts third access parameter information. The third access parameter information includes a parameter related to a UE power class. The parameter related to the UE power class includes at least one of: a wireless coverage level threshold for UE power class, a PRACH parameter for the UE power class, or a maximum number of physical layer repetitions of the downlink physical downlink control channel (PDCCH) of bearer paging scheduling information for the UE power class.

In a sixth aspect, the present disclosure provides a wireless resource configuration method, including:

UE receives third access parameter information broadcast by a base station, where third access parameter information includes a parameter related to a UE power class, and parameter related to the UE power class includes at least one of: a wireless coverage level threshold for UE power class, a PRACH parameter for the UE power class, or a maximum number of physical layer repetitions of the PDCCH of bearer paging scheduling information for the UE power class; and the UE selects in the third access parameter information, an access parameter corresponding to the UE power class of the UE.

In a seventh aspect, the present disclosure provides a wireless resource configuration method, including:

a base station receives radio resource control (RRC) connection information transmitted by UE, where RRC connection information includes UE power class information, and the UE power class information includes a UE power class value or indication information on whether the UE is low power class UE; and the base station determines a UE power class according to the UE power class information.

In an eighth aspect, the present disclosure provides a wireless resource configuration method, including:

UE transmits radio resource control (RRC) connection information to a base station. The RRC connection information includes UE power class information. The UE power class information includes a UE power class value or indication information on whether the UE is low power class UE.

In a ninth aspect, the present disclosure provides a wireless resource configuration device, including a first transmitting module.

The first transmitting module is configured to broadcast first access parameter information. The first access parameter information is configured based on a UE power class and is configured to enable the UE to select an access parameter according to the UE power class.

In a tenth aspect, the present disclosure provides a wireless resource configuration device, including a first receiving module and a first selection module.

The first receiving module is configured to receive the first access parameter information broadcast by a base station. The first access parameter information broadcast is configured based on a UE power class.

The first selection module is configured to select an access parameter corresponding to the UE power class of the UE in the first access parameter information.

In an eleventh aspect, the present disclosure provides a wireless resource configuration device, including a second transmitting module.

The second transmitting module is configured to transmit second access parameter information to UE. The second access parameter information includes a parameter for enabling the UE to learn a wireless coverage level and is configured to enable the UE to determine the wireless coverage level according to a UE power class.

In a twelfth aspect, the present disclosure provides a wireless resource configuration device, including a third receiving module and a fourth determining module.

The third receiving module is configured to receive second access parameter information transmitted by a base station, where the second access parameter information includes a parameter for enabling the UE to learn a wireless coverage level; and The fourth determining module is configured to determine, according to a UE power class of the UE and the second access parameter information, the wireless coverage level of the UE; and determine, according to the wireless coverage level, a resource used for a PRACH.

In a thirteenth aspect, the present disclosure provides a wireless resource configuration device, including a fifth transmitting module.

The fifth transmitting module is configured to broadcast third access parameter information. The third access parameter information includes a parameter related to a UE power class. The parameter related to the UE power class includes at least one of: a wireless coverage level threshold for UE power class, a PRACH parameter for the UE power class, or a maximum number of physical layer repetitions of the PDCCH of bearer paging scheduling information for the UE power class.

In a fourteenth aspect, the present disclosure provides a wireless resource configuration device, including a fifth receiving module and a second selection module.

The fifth receiving module is configured to receive third access parameter information broadcast by a base station. The third access parameter information includes a parameter related to a UE power class. The parameter related to the UE power class includes at least one of: a wireless coverage level threshold for UE power class, a PRACH parameter for the UE power class, or a maximum number of physical layer repetitions of the PDCCH of bearer paging scheduling information for the UE power class.

The second selection module is configured to select an access parameter corresponding to the UE power class of the UE in the third access parameter information.

In a fifteenth aspect, the present disclosure provides a wireless resource configuration device, including a sixth receiving module and an eighth determining module.

The sixth receiving module is configured to receive radio resource control (RRC) connection information transmitted by UE. The RRC connection information includes UE power class information. The UE power class information includes a UE power class value or indication information on whether the UE is low power class UE.

The eighth determining module is configured to determine a UE power class according to the UE power class information.

In a sixteenth aspect, the present disclosure provides a wireless resource configuration device, including a seventh transmitting module.

The seventh transmitting module is configured to transmit radio resource control (RRC) connection information to a base station. The RRC connection information includes UE power class information. The UE power class information includes a UE power class value or indication information on whether the UE is low power class UE.

Moreover, the present disclosure further provides a base station, including a memory, a processor and a wireless resource configuration program stored on the memory and executed on the processor. When executed by the processor, the wireless resource configuration program is configured to implement steps of the wireless resource configuration method described in any one of the first aspect, the third aspect, the fifth aspect and the seventh aspect.

Moreover, the present disclosure further provides a terminal, including a memory, a processor and a wireless resource configuration program stored on the memory and executed on the processor. When executed by the processor, the wireless resource configuration program is configured to implement steps of the wireless resource configuration method described in any one of the second aspect, the fourth aspect, the sixth aspect and the eighth aspect.

Moreover, the present disclosure further provides a computer-readable medium, which is configured to store a wireless resource configuration program. When executed by a processor, the wireless resource configuration program is configured to implement steps of the wireless resource configuration method described in any one of the first to eighth aspect.

The embodiments of the present disclosure provide a wireless resource configuration method and device. A base station broadcasts first access parameter information configured based on a UE power class, and enables UE received the first access parameter information to select, according to the UE power class, an access parameter, so that low power class UE can acquire the access parameter, providing the basic guarantee for communication in the network for the low power class UE.

Other aspects can be understood after the drawings and detailed description are read and understood.

BRIEF DESCRIPTION OF DRAWINGS

FIG. 22 is a structural diagram of a wireless resource configuration device according to embodiment fifteen of the present disclosure;

DETAILED DESCRIPTION

Figure 1:
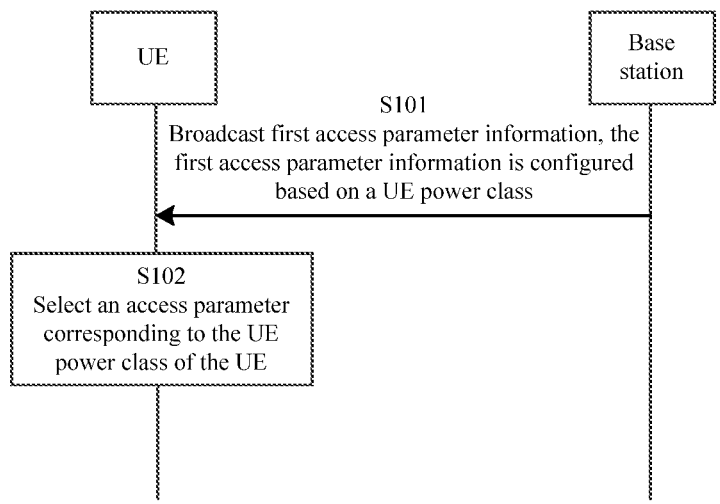
FIG. 1 is a flowchart of a wireless resource configuration method according to embodiment one of the present disclosure.

Technical solutions in embodiments of the present disclosure will be described clearly and completely in conjunction with drawings in the embodiments of the present disclosure.

In a NB-IoT system, the maximum transmit power of a conventional NB-IoT terminal is 20 dBm or 23 dBm. A UE maximum transmit power is represented by a UE power class. For example, the UE maximum transmit power is 20 dBm, corresponding to UE power class 3; and the UE maximum transmit power is 23 dBm, corresponding to UE power class 5. In the M2M application field of the NB-IoT, the UE maximum transmit power may be as low as 14 dbm. It is necessary to configure corresponding parameters for low power class UE to enable the low power class UE to be accessed the network.

An uplink maximum coverage range of the low power class UE is less than a maximum coverage range of high power class UE. In a multiband network, the lower the frequency is, the larger the wireless coverage range is. Therefore, to solve the problem of insufficient coverage of the low power class UE, in the multiband network, how to carry the low power class UE on a low frequency band is a problem that needs to be solved after introducing the low power class UE. And the distribution of the UE in a cell is implemented by the function of cell selection and reselection. A cell selection and reselection parameter currently cannot distinguish the UE power class. Therefore, the current strategy cannot differentially select the frequency band carried by the UE according to the UE power class.

In addition, the NB-IoT system supports coverage enhancement. That is, when the wireless coverage is poor, the receiving reliability of a receiving end is ensured by a repetition transmission of a physical layer of a transmitting end. The larger the number of repetitions is, the greater the receiving reliability is. In addition, the receiving reliability is also related to an emission power. Under a same condition, the larger the UE emission power is, the greater the receiving reliability of an Evolved Node B (eNodeB) is. So, for the UE with different power class, the requirement for the number of physical layer repetitions is different. In the NB-IoT system, the current wireless coverage level threshold (a reference signal receiving power (RSRP) threshold) is set in units of cells, and is configured to the UE by a broadcast message. For an initial PRACH process, a wireless coverage level of the UE is obtained by a comparison between a wireless measuring RSRP value and the RSRP threshold. And for the PRACH process triggered by a physical downlink control channel (PDCCH) order, the wireless coverage level of the UE is indicated by PDCCH downlink control information (DCI). The number of physical layer repetitions of the PRACH and PRACH resource information is configured to the UE at the granularity of the wireless coverage level by the broadcast message. The UE and eNodeB need to transmit and receive PRACH information according to a PRACH parameter carried in the broadcast message corresponding to the wireless coverage level. However, when receiving the PRACH information, the eNodeB does not know an emission power class of the UE. If the eNodeB just corresponds to the number of physical layer repetitions of the PRACH by simply differentiating different UE power class, the eNodeB does not know the PRACH transmitted by which UE power class when receiving the PRACH information, thus the eNodeB cannot normally parse the PRACH information. Therefore, the number of physical layer repetitions of the PRACH cannot be currently configured for the UE power class.

In summary, after the NB-IoT system introduces the low power class UE, various problems occur. To enable the low power class UE to communicate normally, the embodiments of the present disclosure provide a wireless resource configuration method and device for solving the above problems.

To illustrate the technical solutions in the embodiments of the present disclosure, an application scenario is provided. This scenario includes a base station and user equipment connected to each other by an air interface.

The base station in the scenario may include a process, a memory, communications interface and a bus connecting the above components and implementing an information transmission among the above components. The memory is used for storing instructions and data, so that the processor implements specific technical solutions according to the execution of the instructions and data. The air interface is used for a data transmission with external network elements.

In a specific implementation, the memory may be a volatile memory, such as a random access memory (RAM); or may be a non-volatile memory, such as a read only memory (ROM), a flash memory, a hard disk drive (HDD), a solid state drive (SSD) or a combination of the above memories, and provides the instructions and data for the processor.

The processor may be at least one of: an application specific integrated circuit (ASIC), a digital signal processor (DSP), a digital signal processing device (DSPD), a programmable logic device (PLD), a field programmable gate array (FPGA), a central processing unit (CPU), a controller, a microcontroller or a microprocessor. It is to be understood that for different devices, the electronic device for implementing the processor function described above may be others, which is not limited in the embodiments of the present disclosure.

The user equipment in the scenario may also include a process, a memory, communications interface and a bus connecting the above components and implementing an information transmission among the above components. The memory is used for storing instructions and data, so that the processor implements specific technical solutions according to the execution of the instructions and data. The air interface is used for a data transmission with external network elements.

In a specific implementation, the memory may be a volatile memory, such as a random access memory (RAM); or may be a non-volatile memory, such as a read only memory (ROM), a flash memory, a hard disk drive (HDD), a solid state drive (SSD) or a combination of the above memories, and provides the instructions and data for the processor.

The processor may be at least one of: an application specific integrated circuit (ASIC), a digital signal processor (DSP), a digital signal processing device (DSPD), a programmable logic device (PLD), a field programmable gate array (FPGA), a central processing unit (CPU), a controller, a microcontroller or a microprocessor. It is to be understood that for different devices, the electronic device for implementing the processor function described above may be others, which is not limited in the embodiments of the present disclosure.

FIG. 1 is a flowchart of a wireless resource configuration method according to embodiment one of the present disclosure. As shown in FIG. 1, the wireless resource configuration method in this embodiment includes:

In step S101, a base station broadcasts first access parameter information. The first access parameter information is configured based on a UE power class and is configured to enable the UE to select a corresponding access parameter according to the UE power class.

In step S102, the UE selects in the first access parameter information an access parameter corresponding to the UE power class of the UE.

Since how to enable low power class UE to access the network becomes an critical issue in the NB-IoT network after introducing the low power class UE, in this embodiment, the base station broadcasts the first access parameter information. Since the low power class UE is not allocated corresponding wireless transmission resources before accessing the network, the base station is only capable of broadcasting the first access parameter information, so that both the low power class UE and normal power class UE are capable of receiving the first access parameter information. The first access parameter information is configured base on the UE power class and is configured to enable the UE to select the corresponding access parameter according to the UE power class. That is, the base station configures the corresponding access parameter for UE of different UE power class. After receiving the first access parameter information, the UE of different UE power class may select the corresponding access parameter according to its own UE power class.

After receiving the first access parameter information transmitted by the base station, the UE is capable of selecting the access parameter corresponding to its own UE power class in the first access parameter information. The first access parameter information includes at least one parameter of a group consisting of: a UE maximum transmit power applicable to a cell and configured for UE power class, a UE maximum transmit power applicable to a frequency band and configured for UE power class, a minimum receiving level value of the cell configured for UE power class, a minimum quality value of the cell configured for UE power class, a minimum quality threshold configured to initiate a PRACH process and configured for UE power class, a UE maximum transmit power offset applicable to the cell and configured for UE power class, a UE maximum transmit power offset applicable to the frequency band and configured for UE power class, a minimum receiving level value offset of the cell configured for UE power class, a minimum quality value offset of the cell configured for UE power class, a minimum quality threshold offset configured to initiate the PRACH process and configured for UE power class, a reference signal receiving power (RSRP) threshold defined for low power class UE to access the cell, and a reference signal receiving quality threshold defined for the low power class UE to access the cell. That is, the first access parameter information includes at least one of multiple access parameters differentiated by different UE power class. The access parameter includes in the first access parameter information has a corresponding predefined default value, which may include:

a default value of the UE maximum transmit power applicable to the cell and configured for UE power class is set to a default value of a UE maximum transmit power applicable to the cell of the low power class UE;

a default value of the UE maximum transmit power applicable to the frequency band and configured for UE power class is set to a default value of a UE maximum transmit power applicable to a frequency band of the low power class UE;

a default value of the minimum receiving level value of the cell configured for UE power class is set to a default value of a minimum receiving level value of the cell of the low power class UE;

a default value of the minimum quality value of the cell configured for UE power class is set to a default value of a minimum quality value of the cell of the low power class UE;

a default value of the UE maximum transmit power offset applicable to the cell and configured for UE power class is set to a default value of a UE maximum transmit power offset applicable to the cell of the low power class UE;

a default value of the UE maximum transmit power offset applicable to the frequency band and configured for UE power class is set to a default value of a UE maximum transmit power offset applicable to the frequency band of the low power class UE;

a default value of the minimum receiving level value offset of the cell configured for UE power class is set to a default value of a minimum receiving level value offset of the cell of the low power class UE;

a default value of the minimum quality value offset of the cell configured for UE power class is set to a default value of a minimum quality value offset of the cell of the low power class UE;

a default value of the RSRP threshold defined for the low power class UE to access the cell is set to a default value of an RSRP threshold of the low power class UE to access the cell; and a default value of the RSRQ threshold defined for the low power class UE to access the cell is set to a default value of an RSRQ threshold of the low power class UE to access the cell.

It is to be further noted that for the access parameter in the first access parameter information:

the UE maximum transmit power applicable to the cell and configured for UE power class is used for acquiring a UE maximum transmit power applicable to the cell corresponding to the UE according to the UE power class of the UE, and the UE maximum transmit power applicable to the cell is used for determining whether the S criterion for cell selection is met;

the UE maximum transmit power applicable to the frequency band and configured for UE power class is used for acquiring a UE maximum transmit power applicable to the frequency band corresponding to the UE according to the UE power class of the UE, and the UE maximum transmit power applicable to the frequency band is used for determining whether the S criterion for cell selection is met;

the minimum receiving level value of the cell configured for UE power class is used for acquiring a minimum receiving level value of the cell to have the UE to reside according to the UE power class of the UE, and the minimum receiving level value of the cell to have the UE to reside is used for determining whether the S criterion for cell selection is met;

the minimum quality value of the cell configured for UE power class is used for acquiring a minimum quality value of the cell to have the UE to reside according to the UE power class, and the minimum quality value of the cell to have the UE to reside is used for determining whether the S criterion for cell selection is met;

the UE maximum transmit power offset applicable to the cell and configured for UE power class is used for calculating a maximum transmit power applicable to the cell for UE power class, and a maximum transmit power of the low power class UE applicable to the cell is a sum of a maximum transmit power of conventional power class UE applicable to the cell of a cell broadcast and the maximum transmit power offset of the low power class UE applicable to the cell;

the UE maximum transmit power offset applicable to the frequency band and configured for UE power class is used for calculating a maximum transmit power applicable to the frequency band for UE power class, and a maximum transmit power of the low power class UE applicable to the frequency band is a sum of the maximum transmit power of conventional power class UE applicable to the frequency band of the cell broadcast and the maximum transmit power offset of the low power class UE applicable to the frequency band;

the minimum receiving level value offset of the cell configured for UE power class is used for calculating the minimum receiving level value of the cell for UE power class, and the minimum receiving level value of the cell to have the low power class UE to reside is a sum of a minimum receiving level value of the cell to have the conventional power class UE of the cell broadcast to reside and the minimum receiving level value offset of the cell to have the low power class UE to reside; and the minimum quality value offset of the cell configured for UE power class is used for calculating the minimum quality value of the cell for UE power class, and the minimum quality value of the cell to have the low power class UE to reside is a sum of a minimum quality value of the cell to have the conventional power class UE of the cell broadcast to reside and the minimum quality value offset of the cell to have the low power class UE to reside.

It is to be further noted that:

if the UE maximum transmit power applicable to the cell and configured for UE power class is defined in a broadcast message and that the broadcast message does not comprise a parameter value of the UE maximum transmit power applicable to the cell of the low power class UE, the parameter value of the UE maximum transmit power applicable to the cell of the low power class UE is set to a default value of the UE maximum transmit power applicable to the cell of the low power class UE;

if the UE maximum transmit power applicable to the frequency band and configured for UE power class is defined in a broadcast message, and that the broadcast message does not comprise a parameter value of the UE maximum transmit power applicable to the frequency band of the low power class UE, the parameter value of the UE maximum transmit power applicable to the frequency band of the low power class UE is set to a default value of the UE maximum transmit power applicable to the frequency band of the low power class UE;

if the minimum receiving level value of the cell configured for UE power class is defined in a broadcast message, and that the broadcast message does not comprise a parameter value of the minimum receiving level value of the cell of the low power class UE, the parameter value of the minimum receiving level value of the cell of the low power class UE is set to a default value of the minimum receiving level value of the cell of the low power class UE;

if the minimum quality value of the cell configured for UE power class is defined in a broadcast message, and that the broadcast message does not comprise a parameter value of the minimum quality value of the cell of the low power class UE, the parameter value of the minimum quality value of the cell of the low power class UE is the default value of the minimum quality value of the cell of the low power class UE;

if the UE maximum transmit power offset applicable to the cell and configured for UE power class is defined in a broadcast message, and that the broadcast message does not comprise a parameter value of the UE maximum transmit power offset applicable to the cell of the low power class UE, the parameter value of the UE maximum transmit power offset applicable to the of the low power class UE is set to a default value of the UE maximum transmit power offset applicable to the of the low power class UE;

if the UE maximum transmit power offset applicable to the frequency band and configured for UE power class is defined in a broadcast message, and that the broadcast message does not comprise a parameter value of the UE maximum transmit power offset applicable to the frequency band of the low power class UE, the parameter value of the UE maximum transmit power offset applicable to the frequency band of the low power class UE is set to a default value of the UE maximum transmit power offset applicable to the frequency band of the low power class UE;

if the minimum receiving level value offset of the cell configured for UE power class is defined in a broadcast message, and that the broadcast message does not comprise a parameter value of the minimum receiving level value of the cell of the low power class UE, the parameter value of the minimum receiving level value offset of the cell of the low power class UE is set to a default value of the minimum receiving level value offset of the cell of the low power class UE; and if the minimum quality value offset of the cell configured for UE power class is defined in a broadcast message, and that the broadcast message does not comprise a parameter value of the minimum quality value offset of the cell of the low power class UE, the parameter value of the minimum quality value offset of the cell of the low power class UE is set to a default value of the minimum quality value offset of the cell of the low power class UE.

For the access parameter in the first access parameter information, UE may determine, according to its own UE power class, at least one specific access parameter, thereby determining, according to the at least one specific access parameter, whether the UE is capable of residing at the cell provided by the base station or the cell provided by an access base station. For example, the UE is low power class UE. The maximum transmit power is 14 dbm. The UE maximum transmit power applicable to the cell is determined as 14 dbm according to the UE maximum transmit power applicable to the cell and configured for UE power class, the UE can access the cell. If the base station does not broadcast the first access parameter information, the UE maximum transmit power applicable to the cell provided by the base station may be 20 dbm, the low power class UE cannot access the cell. When choosing a camp cell, the UE uses the S criterion for cell selection, and determines, according to the access parameter corresponding to the UE power class, whether the cell provided by the base station fulfills a camp condition.

The UE maximum transmit power applicable to the cell and configured for UE power class may be performed in the following manner: in this embodiment, only two UE power classes are differentiated, UE power class supported by LTE R13 version and UE power class introduced by LTE R14 version. The UE maximum transmit power applicable to the cell respectively corresponds to parameter p-Max-r13 and parameter p-Max-r14. If the UE is the UE power class supported by LTE R13 version, p-Max is the value of parameter p-Max-r13 when determining whether the cell fulfills the camp condition. If the UE is low power class newly introduced by LTE R14 version, p-Max is the value of parameter p-Max-r14 when determining whether the cell fulfills the camp condition.

The UE maximum transmit power offset applicable to the frequency band and configured for UE power class may be performed in the following manner: in this embodiment, only two UE power classes are differentiated, UE power class supported by LTE R13 version and UE power class introduced by LTE R14 version. The UE maximum transmit power offset applicable to the frequency band respectively corresponds to parameter additionalPmax-r13 and parameter additionalPmax-r14. If the UE is the UE power class supported by LTE R13 version, additionalPmax is the value of parameter additionalPmax-r13 when determining whether the cell fulfills the camp condition. If the UE is low power class newly introduced by LTE R14 version, additionalPmax is the value of parameter additionalPmax-r14 when determining whether the cell fulfills the camp condition.

The minimum receiving level value of the cell configured for UE power class may be performed in the following manner: in this embodiment, only two UE power classes are differentiated, UE power class supported by LTE R13 version and UE power class introduced by LTE R14 version. The minimum receiving level value of the cell respectively corresponds to parameter q-RxLevMin-r13 and parameter q-RxLevMin-r14. If the UE is the UE power class supported by LTE R13 version, q-RxLevMin is the value of parameter q-RxLevMin-r13 when determining whether the cell fulfills the camp condition. If the UE is low power class newly introduced by LTE R14 version, q-RxLevMin is the value of parameter q-RxLevMin-r14 when determining whether the cell fulfills the camp condition.

The minimum quality value of the cell configured for UE power class may be performed in the following manner: in this embodiment, only two UE power classes are differentiated, UE power class supported by LTE R13 version and UE power class introduced by LTE R14 version. The minimum quality value of the cell respectively corresponds to parameter q-QualMin-r13 and parameter q-QualMin-r14. If the UE is the UE power class supported by LTE R13 version, q-QualMin is the value of parameter q-QualMin-r13 when determining whether the cell fulfills the camp condition. If the UE is low power class newly introduced by LTE R14 version, q-QualMin is the value of parameter q-QualMin-r14 when determining whether the cell fulfills the camp condition.

In the wireless resource configuration method provided by this embodiment, the base station broadcasts the first access parameter information configured based on the UE power class, and enables the UE received the first access parameter information to select, according to the UE power class, the access parameter, so that the low power class UE can acquire the access parameter, providing the basic guarantee for communication in the network for the low power class UE.

Figure 2:
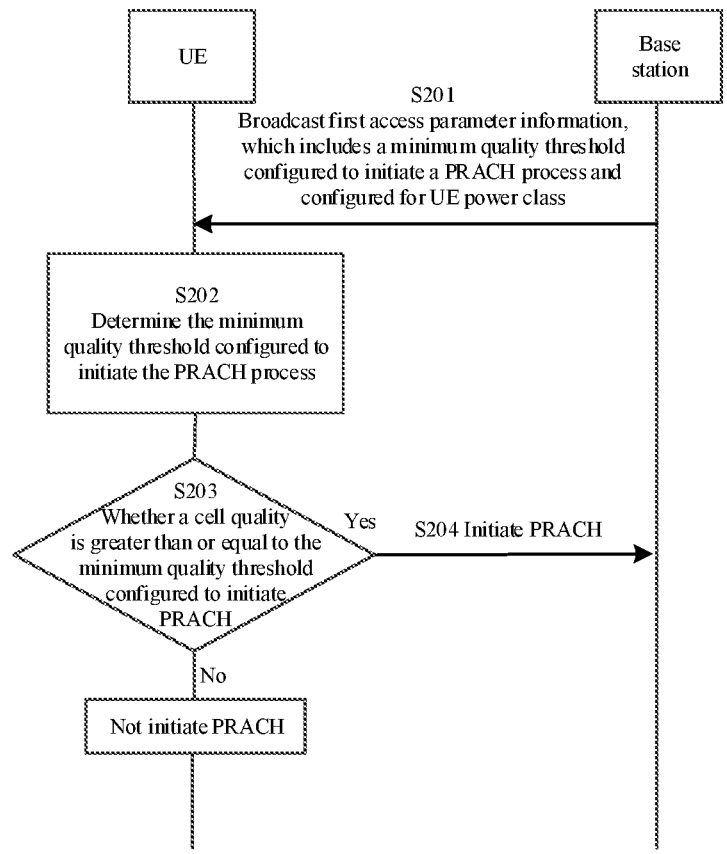
FIG. 2 is a flowchart of a wireless resource configuration method according to embodiment two of the present disclosure.

FIG. 2 is a flowchart of a wireless resource configuration method according to embodiment two of the present disclosure. As shown in FIG. 2, the wireless resource configuration method in this embodiment includes:

In step S201: a base station broadcasts first access parameter information. The first access parameter information includes a minimum quality threshold configured to initiate a PRACH process and configured for UE power class.

In step S202, the UE determines, according to the UE power class, the minimum quality threshold configured to initiate the PRACH process.

In step S203, the UE determines whether a cell quality is currently greater than or equal to the minimum quality threshold configured to initiate the PRACH process.

In step S204, if the cell quality is currently greater than or equal to the minimum quality threshold configured to initiate the PRACH process, the UE is capable of initiating the PRACH, otherwise, the UE is incapable of initiating the PRACH.

Since an uplink transmit power of the low power class UE is low, and the UE may be accessed and resided at the cell provided by the base station, but when the UE is performing the PRACH process, if the cell quality is poor, the interference on an uplink signal transmitted by the UE is severe, and the PRACH process may fail due to low uplink transmit power. Therefore, the base station may include, in the transmitted first access parameter information, the minimum quality threshold configured to initiate the PRACH process and configured for UE power class, that is, a minimum cell quality threshold capable of supporting the UE to initiate the PRACH process configured to different UE power classes. After receiving the first access parameter information broadcast by the base station, the UE may determine, according to its own UE power class, the minimum quality threshold configured to initiate the PRACH process. Then, the UE determines the relationship between the quality of the cell the UE currently resides and the minimum quality threshold configured to initiate the PRACH process. If the cell quality is currently greater than or equal to the minimum quality threshold configured to initiate the PRACH process, the UE is capable of initiating the PRACH, otherwise, the UE is incapable of initiating the PRACH.

Moreover, when the UE does not receive any parameter configured for UE power class, the UE determines whether the cell quality is currently greater than or equal to a preset default value corresponding to the minimum quality threshold applicable to initiate the PRACH process. If the cell quality is currently greater than or equal to the preset default value, the UE is capable of initiating the PRACH, otherwise, the UE is incapable of initiating the PRACH. It is to be noted that, the preset default value corresponding to the minimum quality threshold configured to initiate the PRACH process may be a default value defined by standards, which may avoid a case in which the PRACH process performed by the low power class fails due to poor cell quality when the UE does not receive any parameter configured for UE power class, thereby saving the wireless resources.

Moreover, in an exemplary implementation mode, a minimum quality threshold applicable to initiate a PRACH process may be defined only according to a cell not supporting low power class UE signaling, and the minimum quality threshold applicable to initiate the PRACH process is a predefined default value.

For the cell not supporting low power class UE signaling, the method of the present disclosure may further include:

the low power class UE determines the cell quality is currently greater than or equal to the minimum quality threshold of the cell not supporting low power class UE signaling to initiate the PRACH process, if yes, the UE is capable of initiating the PRACH, otherwise, the UE is incapable of initiating the PRACH;

the cell not supporting low power class UE signaling is determined according to whether a parameter or an indication for configuring the low power class UE is included in a cell broadcast, if no parameter or indication for configuring the low power class UE is included in the cell broadcast, the UE confirms the cell as the cell not supporting low power class UE.

Figure 3:
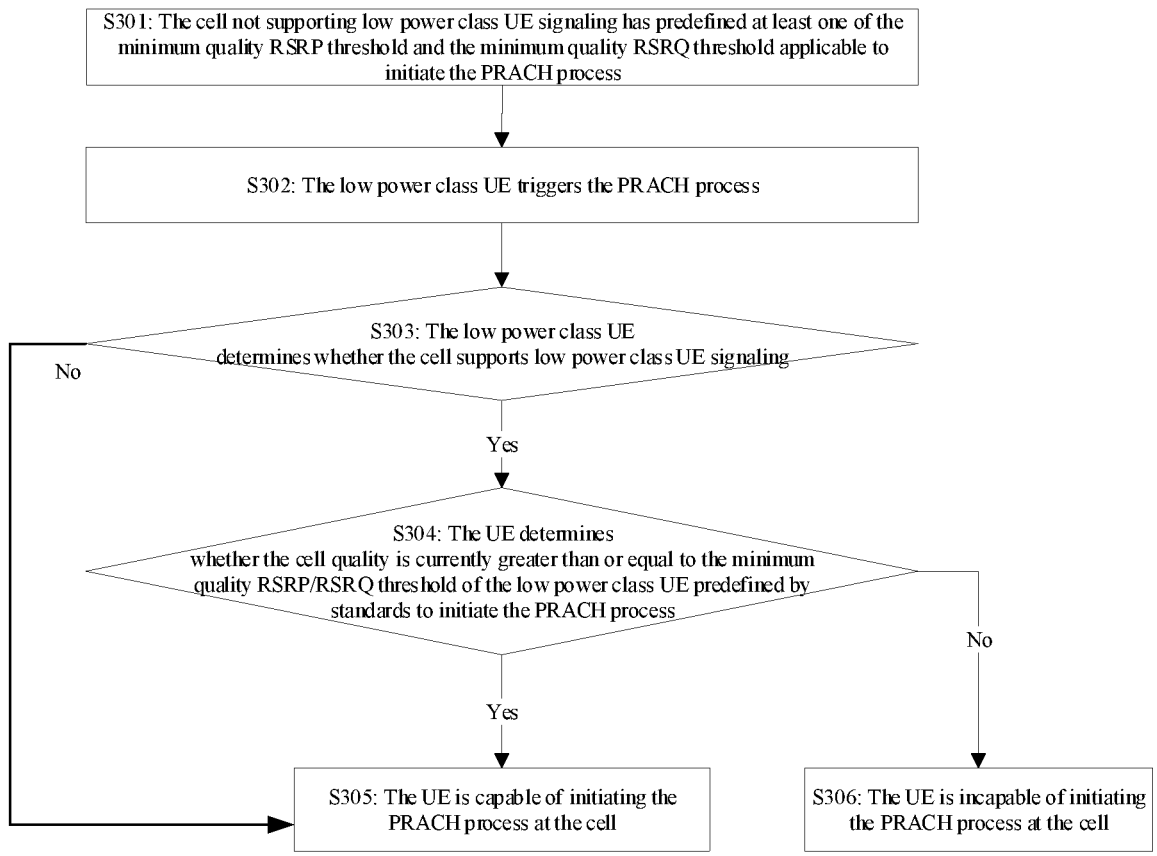
FIG. 3 is a flowchart of triggering a PRACH process by low power class UE according to an embodiment of the present disclosure.

For the above exemplary implementation mode, FIG. 3 shows an exemplary of triggering the PRACH process by the low power class UE when the cell not supporting low power class UE signaling has predefined the minimum quality threshold applicable to the low power class UE to initiate the PRACH process. In FIG. 3, the minimum quality threshold applicable to initiate the PRACH process uses at least one of RSRP threshold or RSRQ threshold as an example, and the steps included may be described below.

In step S301, the cell not supporting low power class UE signaling has predefined at least one of the minimum quality RSRP threshold or the minimum quality RSRQ threshold applicable to initiate the PRACH process.

In step S302: the low power class UE triggers the PRACH process.

In step S303: the low power class UE determines whether the cell supports low power class UE signaling. If yes, the process goes into S304. If not, the process goes into S305.

It is to be noted that the cell not supporting low power class UE signaling may be determined based on whether the relevant parameter or indication of the low power class UE is included in the cell broadcast. If no parameter for configuring the low power class UE is included in the cell broadcast, the UE determines that the cell is the cell not supporting low power class UE signaling.

In step S304, the UE determines whether the cell quality is currently greater than or equal to the minimum quality RSRP/RSRQ threshold of the low power class UE predefined by standards to initiate the PRACH process. If yes, the process goes into S305. If not, the process goes into S306.

In step S305: the UE is capable of initiating the PRACH process at the cell.

In step S306: the UE is incapable of initiating the PRACH process at the cell.

Moreover, in an exemplary implementation mode, at least one of RSRP threshold or RSRQ threshold of the low power class UE to access the cell is defined a system broadcast message, and then the low power class UE performs cell selection and reselection, which may include at least one of the following:

the low power class UE determines whether the cell quality is currently greater than or equal to the RSRP threshold of the low power class UE to access the cell; if the cell quality is currently greater than or equal to the RSRP threshold of the low power class UE to access the cell, the low power class UE determines, according to the S criterion selected by a current cell, whether the current cell fulfills the camp condition; otherwise, the low power class UE reduces a reselection priority of the current cell or determine the current cell is unacceptable for camping;

the low power class UE determines whether the cell quality is currently greater than or equal to the RSRQ threshold of the low power class UE to access the cell; if the cell quality currently is greater than or equal to the RSRQ threshold of the low power class UE to access the cell, the low power class UE determines, according to the S criterion selected by the current cell, whether the current cell fulfills the camp condition; otherwise, the low power class UE reduces the reselection priority of the current cell or confirm the current cell is unacceptable for camping; and the low power class UE determines whether the cell quality is currently greater than or equal to the RSRP threshold and the RSRQ threshold of the low power class UE to access the cell; if the cell quality is currently greater than or equal to the RSRP threshold and the RSRQ threshold of the low power class UE to access the cell, the low power class UE determines, according to the S criterion selected by the current cell, whether the current cell fulfills the camp condition; otherwise, the low power class UE reduces the reselection priority of the current cell or confirm the current cell is unacceptable for camping.

It is to be noted that the step in which the low power class UE reduces the reselection priority of the current cell may include at least one of the following:

the low power class UE firstly selects a cell in which the cell quality is greater than or equal to the RSRP threshold of the low power class UE to access the cell to reside; if there is no other cells in which the cell quality is greater than or equal to the RSRP threshold of the low power class UE to access the cell, the cell in which the cell quality is less than the RSRP threshold of the low power class UE to access the cell is selected to reside;

the low power class UE firstly selects the cell in which the cell quality is greater than or equal to the RSRQ threshold of the low power class UE to access the cell to reside; if there is no other cells in which the cell quality is greater than or equal to the RSRQ threshold of the low power class UE to access the cell, the cell in which the cell quality is less than the RSRQ threshold of the low power class UE to access the cell is selected to reside; or the low power class UE firstly selects the cell in which the cell quality is greater than or equal to the RSRP threshold and the RSRQ threshold of the low power class UE to access the cell to reside; if there is no other cells in which the cell quality is greater than or equal to the RSRP threshold and the RSRQ threshold of the low power class UE to access the cell, the cell in which the cell quality is less than the RSRP threshold or the RSRQ threshold of the low power class UE to access the cell is selected to reside.

Correspondingly, the low power class UE confirms the current cell is unacceptable for camping, which includes: the low power class UE confirms the current cell is in an access barred status, and the current cell is excluded when the cell selection and reselection.

It is to be noted that when the UE does not receive at least one parameter of the RSRP threshold and the RSRQ threshold of the low power class UE to access the cell, at least one of the RSRP threshold or the RSRQ threshold of the low power class UE to access the cell is a predefined default value.

Figure 4:
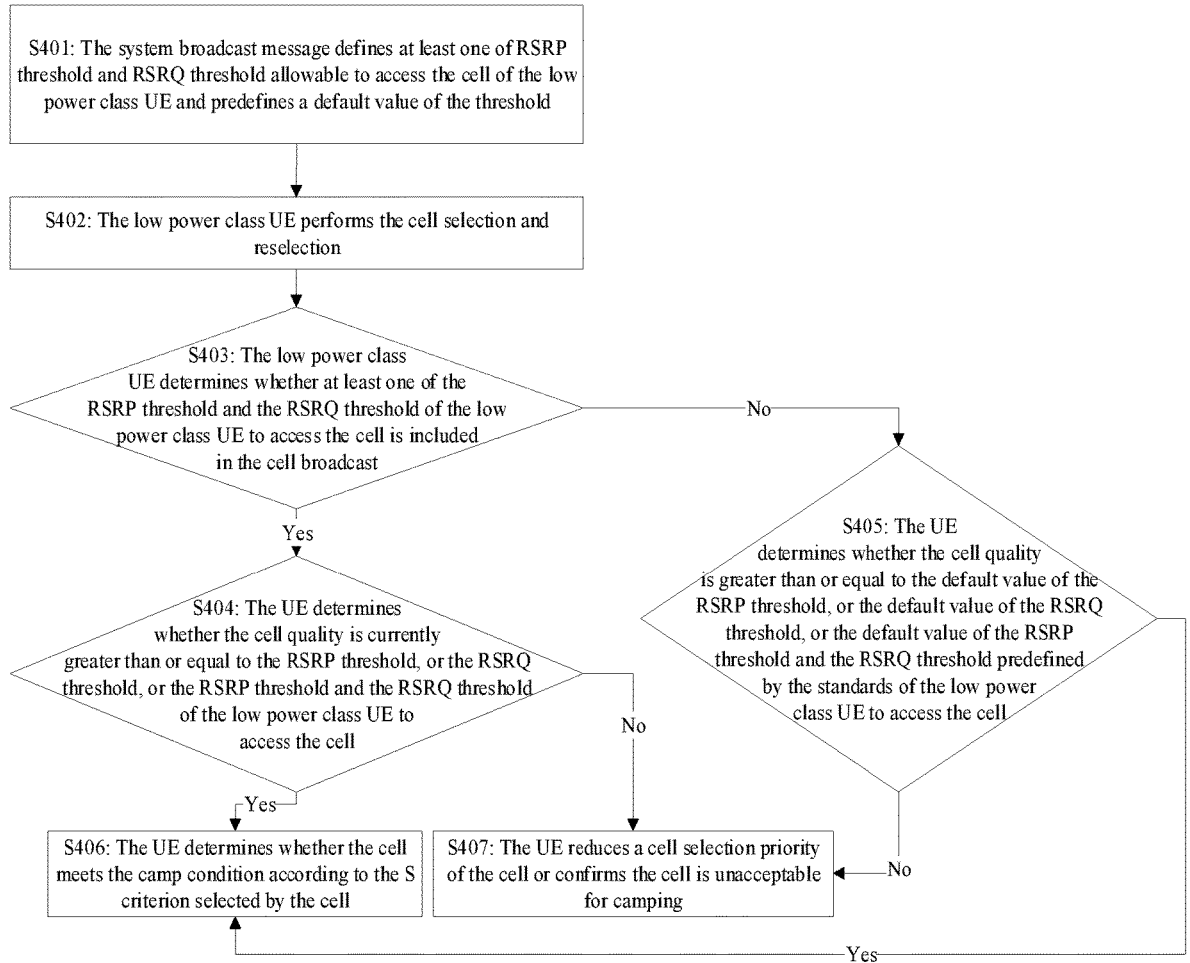
FIG. 4 is a flowchart of cell selection and reselection of low power class UE according to an embodiment of the present disclosure.

For this implementation mode, FIG. 4 shows a process of cell selection and reselection of the low power class UE. The steps included are described below.

In step 401: the system broadcast message defines at least one of RSRP threshold or RSRQ threshold applicable to access the cell of the low power class UE and predefines a default value of the threshold.

In step 402: the low power class UE performs the cell selection and reselection.

In step 403: the low power class UE determines whether at least one of the RSRP threshold or the RSRQ threshold of the low power class UE to access the cell is included in the cell broadcast. If yes, the process goes into S404. If not, the process goes into S405.

In step S404: the UE determines whether the cell quality is currently greater than or equal to the RSRP threshold, or the RSRQ threshold, or the RSRP threshold and the RSRQ threshold of the low power class UE to access the cell. If yes, the process goes into S406. If not, the process goes into S407. For example, when the low power class UE determines the RSRP threshold of the low power class UE to access the cell is included in the cell broadcast, the UE determines whether the cell quality is currently greater than or equal to the RSRP threshold of the low power class UE to access the cell. If yes, the process goes into S406. If not, the process goes into S407. When the low power class UE determines the RSRQ threshold of the low power class UE to access the cell is included in the cell broadcast, the UE determines whether the cell quality is currently greater than or equal to the RSRQ threshold of the low power class UE to access the cell. If yes, the process goes into S406. If not, the process goes into S407. When the low power class UE determines the RSRP threshold and the RSRQ threshold of the low power class UE to access the cell are included in the cell broadcast, the UE determines whether the cell quality is currently greater than or equal to the RSRP threshold and the RSRQ threshold of the low power class UE to access the cell. If yes, the process goes into S406. If not, the process goes into S407.

In step S405: the UE determines whether the cell quality is greater than or equal to the default value of the RSRP threshold, or the default value of the RSRQ threshold, or the default value of the RSRP threshold and the RSRQ threshold predefined by the standards of the low power class UE to access the cell. If yes, the process goes into S406. If not, the process goes into S407. For example, the UE determines whether the cell quality is greater than or equal to the default value of the RSRP threshold predefined by the standards of the low power class UE to access the cell. If yes, the process goes into S406. If not, the process goes into S407. Or the UE determines whether the cell quality is greater than or equal to the default value of the RSRQ threshold predefined by the standards of the low power class UE to access the cell. If yes, the process goes into S406. If not, the process goes into S407. Or UE determines whether the cell quality is greater than or equal to the default value of the RSRP threshold and the RSRQ threshold predefined by the standards of the low power class UE to access the cell. If yes, the process goes into S406. If not, the process goes into S407.

In step S406: the UE determines whether the cell fulfills the camp condition according to the S criterion selected by the cell.

In step S407: the UE reduces a cell selection priority of the cell or confirms the cell is unacceptable for camping.

The step in which the UE reduces the cell selection priority of the cell may includes at least one of:

the low power class UE preferably selects the cell in which the cell quality is greater than or equal to the RSRP threshold of the low power class UE to access the cell to reside; only when there is no other cells in which the cell quality is greater than or equal to the RSRP threshold of the low power class UE to access the cell, the cell in which the cell quality is less than the RSRP threshold of the low power class UE to access the cell is selected to reside;

the low power class UE preferably selects the cell in which the cell quality is greater than or equal to the RSRQ threshold of the low power class UE to access the cell to reside; only when there is no other cells in which the cell quality is greater than or equal to the RSRQ threshold of the low power class UE to access the cell, the cell in which the cell quality is less than the RSRQ threshold of the low power class UE to access the cell is selected to reside; or the low power class UE preferably selects the cell in which the cell quality is greater than or equal to the RSRP threshold and the RSRQ threshold of the low power class UE to access the cell to reside; only when there is no other cells in which the cell quality is greater than or equal to the RSRP threshold and the RSRQ threshold of the low power class UE to access the cell, the cell in which the cell quality is less than the RSRP threshold or the RSRQ threshold of the low power class UE to access the cell is selected to reside.

The step in which the low power class UE confirms the cell is unacceptable for camping may be: the low power class UE believes that the cell is in a state which equals to Barred. The UE directly excludes the cell when cell selects and reselects.

Moreover, in an exemplary implementation mode, when communication standards have predefined at least one of RSRP threshold or RSRQ threshold of the low power class UE to access the cell for s cell not supporting the low power class UE signaling, the low power class UE performs the cell selection and reselection. It is to be noted that the at least one of the RSRP threshold or the RSRQ threshold of the low power class UE to access the cell is defined only according to the cell not supporting the low power class UE signaling, and the at least one of the RSRP threshold or the RSRQ threshold of the low power class UE to access the cell is a predefined default value.

The method may also include at least one of the following:

for the cell not supporting the low power class UE signaling, the low power class UE determines whether the cell quality is currently greater than or equal to a predefined value of the RSRP threshold of the low power class UE to access the cell, if the cell quality is currently greater than or equal to the predefined value of the RSRP threshold of the low power class UE to access the cell, the low power class UE determines, according to the S criterion for cell selection whether the current cell fulfills the camp condition; otherwise, the low power class UE reduces the selection priority of the current cell or confirm the current cell is unacceptable for camping;

for the cell not supporting the low power class UE signaling, the low power class UE determines whether the cell quality is currently greater than or equal to the predefined value of the RSRQ threshold of the low power class UE to access the cell, if the cell quality is currently greater than or equal to the predefined value of the RSRQ threshold of the low power class UE to access the cell, the low power class UE determines, according to the S criterion for cell selection whether the current cell fulfills the camp condition; otherwise, the low power class UE reduces the selection priority of the current cell or confirm the current cell is unacceptable for camping; or for the cell not supporting the low power class UE signaling, the low power class UE determines whether the cell quality is currently greater than or equal to the predefined value of the RSRP threshold and the RSRQ threshold of the low power class UE to access the cell; if the cell quality is currently greater than or equal to the predefined value of the RSRP threshold and the RSRQ threshold of the low power class UE to access the cell, the low power class UE determines, according to the S criterion for cell selection whether the current cell fulfills the camp condition; otherwise, the low power class UE reduces the selection priority of the current cell or confirm the current cell is unacceptable for camping.

It is to be noted that the method may also include:

The cell not supporting low power class UE signaling is determined according to whether a parameter or an indication for configuring the low power class UE is included in a cell broadcast. If no parameter or indication for configuring the low power class UE is included in the cell broadcast, the UE confirms the cell as the cell not supporting low power class UE.

Figure 5:
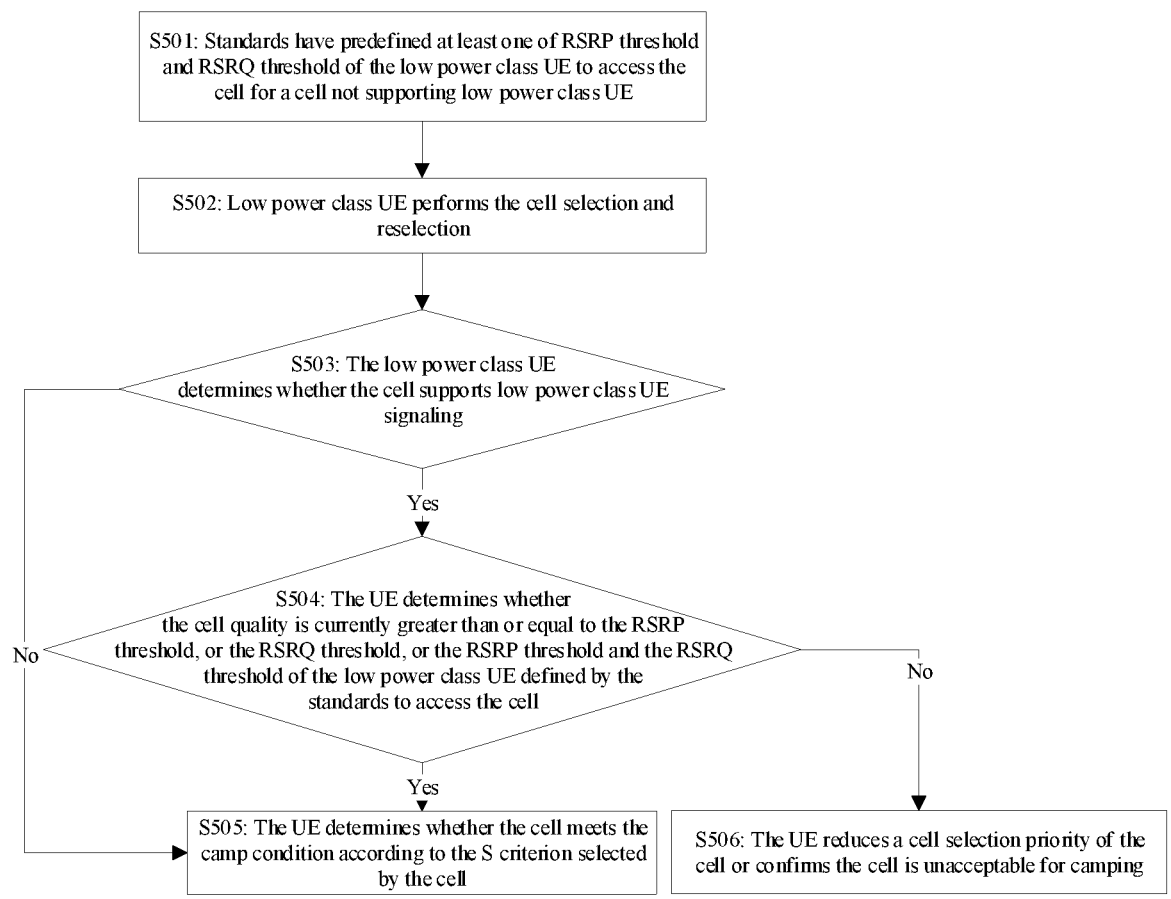
FIG. 5 is a flowchart of cell selection and reselection of another low power class UE according to an embodiment of the present disclosure.

FIG. 5 shows a process of cell selection and reselection of another low power class UE. The steps included may be described below.

In step S501: standards have predefined at least one of RSRP threshold or RSRQ threshold of the low power class UE to access the cell for a cell not supporting low power class UE.

In step S502: the low power class UE performs the cell selection and reselection.

In step S503: the low power class UE determines whether the cell supports low power class UE signaling. If yes, the process goes into S504. If not, the process goes into S505.

It is to be noted that the cell not supporting low power class UE signaling may be determined based on whether the relevant parameter or indication of the low power class UE is included in the cell broadcast. If no parameter for configuring the low power class UE is included in the cell broadcast, the UE determines that the cell is the cell not supporting low power class UE signaling.

In step S504: the UE determines whether the cell quality is currently greater than or equal to the RSRP threshold, or the RSRQ threshold, or the RSRP threshold and the RSRQ threshold of the low power class UE defined by the standards to access the cell. If yes, the process goes into S505. If not, the process goes into S506. For example, if the standards have predefined the RSRP threshold of the low power class UE to access the cell for the cell not supporting low power class UE, the UE determines whether the cell quality is currently greater than or equal to the RSRP threshold predefined by the standards of the low power class UE to access the cell. If yes, the process goes into S505. If not, the process goes into S506. If the standards have predefined the RSRQ threshold of the low power class UE to access the cell for the cell not supporting low power class UE, the UE determines whether the cell quality is currently greater than or equal to the RSRQ threshold predefined by the standards of the low power class UE to access the cell. If yes, the process goes into S505. If not, the process goes into S506. If the standards have predefined the RSRP threshold and the RSRQ threshold of the low power class UE to access the cell for the cell not supporting low power class UE, the UE determines whether the cell quality is currently greater than or equal to the RSRP threshold and the RSRQ threshold predefined by the standards of the low power class UE to access the cell. If yes, the process goes into S505. If not, the process goes into S506.

In step S505: the UE determines whether the cell fulfills the camp condition according to the S criterion selected by the cell.

In step S506: the UE reduces a cell selection priority of the cell or confirms the cell is unacceptable for camping.

The step in which the UE reduces the cell selection priority of the cell may include at least one of:

the low power class UE preferably selects the cell in which the cell quality is greater than or equal to the RSRP threshold of the low power class UE to access the cell to reside; only when there is no other cells in which the cell quality is greater than or equal to the RSRP threshold of the low power class UE to access the cell, the cell in which the cell quality is less than the RSRP threshold of the low power class UE to access the cell is selected;

the low power class UE preferably selects the cell in which the cell quality is greater than or equal to the RSRQ threshold of the low power class UE to access the cell to reside; only when there is no other cells in which the cell quality is greater than or equal to the RSRQ threshold of the low power class UE to access the cell, the cell in which the cell quality is less than the RSRQ threshold of the low power class UE to access the cell is selected to reside; or the low power class UE preferably selects the cell in which the cell quality is greater than or equal to the RSRP threshold and the RSRQ threshold of the low power class UE to access the cell to reside; only when there is no other cells in which the cell quality is greater than or equal to the RSRP threshold and the RSRQ threshold of the low power class UE to access the cell, the cell in which the cell quality is less than the RSRP threshold or the RSRQ threshold of the low power class UE to access the cell is selected to reside.

The step in which the low power class UE confirms the cell is unacceptable for camping may be: the low power class UE believes that the cell is in a state which equals to Barred. The UE directly excludes the cell when cell selects and reselects.

Figure 6:
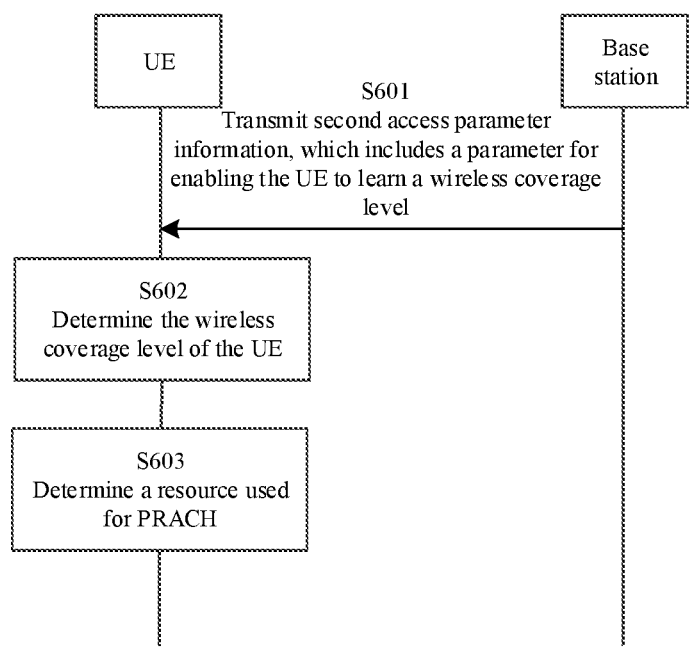
FIG. 6 is a flowchart of a wireless resource configuration method according to embodiment three of the present disclosure.

FIG. 6 is a flowchart of a wireless resource configuration method according to embodiment three of the present disclosure. As shown in FIG. 6, the wireless resource configuration method in this embodiment includes the steps described below.

In step S601: a base station transmits second access parameter information to UE. The second access parameter information includes a parameter for enabling the UE to learn a wireless coverage level. The second access parameter information is used for enabling the UE received the second access parameter information to determine the wireless coverage level according to a UE power class.

In step S602: the UE determines the wireless coverage level according to the UE power class and the second access parameter information.

In step S603: the UE determines a resource used for PRACH according to the wireless coverage level.

Before the UE is accessed the base station and communication by the cell provided by the base station, used transmission resources need to be determined firstly. For the low power class UE, if a resource is used the same as the resource used for conventional power class UE, then the transmission may fail. Therefore, the base station may transmit the second access parameter information to the UE. The second access parameter information includes a parameter for enabling the UE to learn the wireless coverage level according to the UE power class. Since an uplink transmission power the UE with different UE power class is different, a wireless coverage capability of the UE with different UE power class is different. The UE with different wireless coverage capability is differentiated by different wireless coverage level. The second access parameter information may be carried by different message. After receiving the second access parameter information, the UE determines, according to its own UE power class, the wireless coverage level corresponding to the UE. Then, the UE, according to the determined wireless coverage level, determines the subsequent communication, that is, the resource used for the PRACH process.

After transmitting the second access parameter information to the UE, the base station enables the UE received the second access parameter information to determine according to its own UE power class, the wireless coverage level, and determine, according to the wireless coverage level, the resource used for the PRACH, which enables that the low power class UE is capable of determining the resource used for the PRACH process in the network and provides the basic guarantee for communication in the network for the UE.

Figure 7:
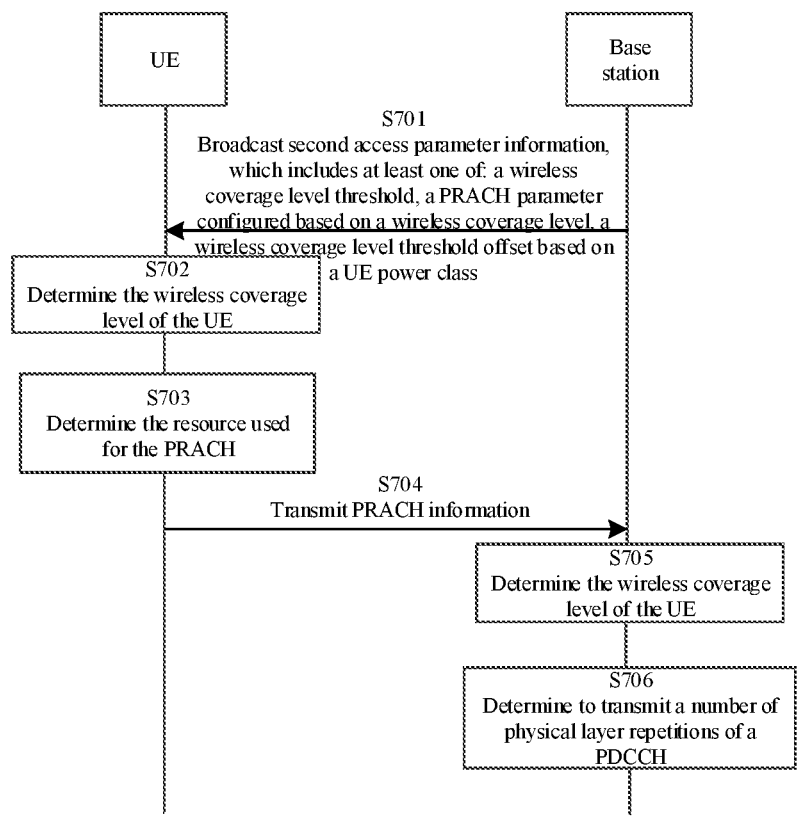
FIG. 7 is a flowchart of a wireless resource configuration method according to embodiment four of the present disclosure.

FIG. 7 is a flowchart of a wireless resource configuration method according to embodiment four of the present disclosure. As shown in FIG. 7, the wireless resource configuration method in this embodiment includes the steps described below.

In step S701, a base station broadcasts second access parameter information. The second access parameter information includes at least one of: a wireless coverage level threshold, a PRACH parameter configured based on a wireless coverage level, or a wireless coverage level threshold offset based on a UE power class.

In step S702, the UE determines the wireless coverage level of the UE according to the UE power class and the second access parameter information.

In step S703, the UE determines, according to the wireless coverage level, the resource used for the PRACH.

In step S704, the UE transmits PRACH information on the determined resource.

In step S705, after receiving the PRACH information, the base station determines, according to the resource occupied by the PRACH information, the wireless coverage level of the UE.

In step S706, the base station determines, according to the wireless coverage level of the UE, to transmit a number of physical layer repetitions of a PDCCH.

Before the UE accesses the cell provided by the base station or resides at the cell provided by the base station, the base station cannot learn the transmission resource used for communication by the UE, thus it is necessary to broadcast the second access parameter information. The second access parameter information includes at least one of: the wireless coverage level threshold, the PRACH parameter configured based on the wireless coverage level, or the wireless coverage level threshold offset based on the UE power class. After receiving the second access parameter information, the UE compares, according to its own UE power class and a wireless coverage measurement value, with the wireless coverage level threshold, thereby acquiring the wireless coverage level in which the UE is currently located. After determining the wireless coverage level in which the UE is currently located, the UE determines the resource used for the PRACH according to the PRACH parameter configured based on the wireless coverage level.

After determining the resource used for the PRACH, the UE may use the resource for the PRACH process and transmit PRACH information to the base station, such as PRACH preamble information in an initial PRACH process. After receiving the PRACH information transmitted by the UE, the base station may determine the wireless coverage level of the UE according to the resource used by the PRACH information. Since the wireless coverage level of the UE has a corresponding relationship with the UE power class, after determining the wireless coverage level of the UE, the UE may determine to transmit the number of physical layer repetitions of the PDCCH. Since the UE with different power class has different receiving capability, and the receiving capability of the low power class UE is poor, therefore, large number of downlink physical layer repetitions is required for the low power class UE in order to enhance the receiving capability of the UE.

The method of determining, by the UE, according to its own UE power class and the second access parameter information, the wireless coverage level may be: for the initial PRACH process of conventional power class UE: after receiving a broadcast message, the conventional power class UE acquires a wireless coverage level RSRP threshold [threshold 0, threshold 1]: determining the wireless coverage level by comparing the wireless coverage level RSRP threshold with a RSRP value measured currently; a coverage in which the RSRP value is greater than or equal to the threshold 0 is coverage level 0; a coverage in which the RSRP value is less than the threshold 0 and greater than or equal to the threshold 1 is coverage level 1; and a coverage in which the RSRP value is less than the threshold 1 is coverage level 2. For the initial PRACH process of the low power class UE: after receiving the broadcast message, the low power class UE acquires the wireless coverage level RSRP threshold [threshold 0, threshold 1]: determining the wireless coverage level by a high coverage level threshold (the threshold 0) and automatically reduce one class of the determined wireless coverage level: a coverage which is greater than or equal to the threshold 0 is the coverage level 1 and a coverage which is less than the threshold 0 is the coverage level 2.

The method of determining, by the UE, according to its own UE power class and the second access parameter information, the wireless coverage level may be: for the initial PRACH process of conventional power class UE: after receiving the broadcast message, the conventional power class UE acquires a wireless coverage level RSRP threshold [threshold 0, threshold 1]: determining the wireless coverage level by comparing the wireless coverage level RSRP threshold with a RSRP value measured currently; a coverage in which the RSRP value is greater than or equal to the threshold 0 is coverage level 0; a coverage in which the RSRP value is less than the threshold 0 and greater than or equal to the threshold 1 is coverage level 1; and a coverage in which the RSRP value is less than the threshold 1 is coverage level 2. A minimum receiving level threshold selected by the cell is configured as −140 dBm, which can guarantee that the conventional power class UE can only reside at a cell whose wireless quality is greater than −140 dBm. For the initial PRACH process of the low power class UE: after receiving the broadcast message, the low power class UE acquires the wireless coverage level RSRP threshold [threshold 0, threshold 1]: determining the wireless coverage level by comparing wireless coverage level RSRP threshold +6 dB with the RSRP value measured currently: a coverage in which the RSRP value is greater than or equal to "the threshold 0+6 dB" is the coverage level 0; a coverage in which the RSRP value is less than "the threshold 0+6 dB", and greater than or equal to "the threshold 1+6 dB" is the coverage level 1 and a coverage in which the RSRP value is less than "the threshold 1+6 dB" is the coverage level 2. The 6 dB added in the above determination is a predefined offset value, this value may be adjusted according to the actual network situation or be a wireless coverage level threshold deviation transmitted by an eNB to the UE by the broadcast message. The minimum receiving level threshold selected by the cell is configured as −140 dBm and the relevant parameter selected by the cell is reasonably configured, enabling that the low power class UE obtains a power compensation of 6 dB in the reselection process and guaranteeing that the low power class UE can only reside at a cell whose wireless quality is greater than −140 dBm+6 dB.

On the basis of the embodiment shown in FIG. 7, after the UE triggers the PRACH process, the UE may also transmit RRC connection information to the base station in the PRACH process. The RRC connection information includes at least one of the UE power class or the downlink wireless coverage level of the low power class UE. The RRC connection information includes at least one of RRC connection request information, RRC connection resume request information, or RRC connection reestablishment request information. At least one of the UE power class or the downlink wireless coverage level of the low power class UE included in the RRC connection information is reported by RRC signaling or a MAC control unit in the RRC connection information.

Two bits in the MAC control unit in the current NB-IoT system are reserved and unused. When the UE reports at least one of the UE power class or the downlink wireless coverage level of the low power class UE by the MAC control unit, for example, two bits may be reserved in the MAC control unit for reporting the UE power class and the wireless coverage level of new power class UE. The two bits have four values: 0 represents the wireless coverage level 0 of the low power class UE; 1 represents the wireless coverage level 1 of the low power class UE; 2 represents the wireless coverage level 2 of the low power class UE and 3 represents the conventional power class UE.

FIG. 7 shows that the base station broadcasts the second access parameter information, that is, the base station transmits the second access parameter information in the initial PRACH process. Moreover, the base station may also transmit the second access parameter information to the UE by a PDCCH order. The second access parameter information includes an uplink coverage level and a downlink coverage level of the UE, or the second access parameter information includes the uplink coverage level and the number of physical layer repetitions of the PDCCH of the UE. The base station, determines according to the downlink coverage level of the UE in the second access parameter information, to transmit the number of physical layer repetitions of the PDCCH to the UE, or the base station determines according to the number of physical layer repetitions of the PDCCH in the second access parameter information, to transmit the number of physical layer repetitions of the PDCCH to the UE. After the UE receives the second access parameter information transmitted by the base station by the PDCCH order, the UE may directly acquire the coverage level information and determine, according to the downlink coverage level in the second access parameter information, the number of physical layer repetitions of the PDCCH transmitted by the base station, or determine, according to the number of physical layer repetitions of the PDCCH in the second access parameter information, to receive the number of physical layer repetitions of the PDCCH transmitted by the base station.

13 bits in the PDCCH order in the current NB-IoT system are reserved and unused. When the UE reports at least one of the UE power class or the downlink wireless coverage level of the UE by the PDCCH order, for example, two bits may be reserved in the PDCCH order for indicating the downlink wireless coverage level of the low power class UE. The downlink wireless coverage level is determined based on a matching between the number of physical layer downlink repetitions of a PDCCH common search space (CSS) of the UE and the PRACH parameter. The number of physical layer downlink repetitions of the PDCCH CSS is determined based on the number of historical downlink repetitions of the UE or historical report information of the UE. For example, 11 bits may be reserved in the PDCCH order for indicating the exemplary of the number of physical layer repetitions of the PDCCH CSS of the low power class UE. The number of physical layer repetitions of the PDCCH CSS is determined based on the number of historical downlink repetitions of the UE or historical report information of the UE. 4 bits may be reserved in the PDCCH order for indicating an index of the number of physical layer repetitions of the PDCCH CSS of the low power class UE. The number of physical layer repetitions of the PDCCH CSS is determined based on the number of historical downlink repetitions of the UE or historical report information of the UE. The index of the number of physical layer repetitions of the PDCCH CSS corresponds to a value in a value set {1, 2, 4, 8, 16, 32, 64, 128, 256, 512, 1024, 2048} of the number of physical layer repetitions of the PDCCH CSS. For example, index 0 corresponds to physical layer repetition number 1, index 1 corresponds to physical layer repetition number 2 . . . index 11 corresponds to physical layer repetition number 2048.

Figure 8:
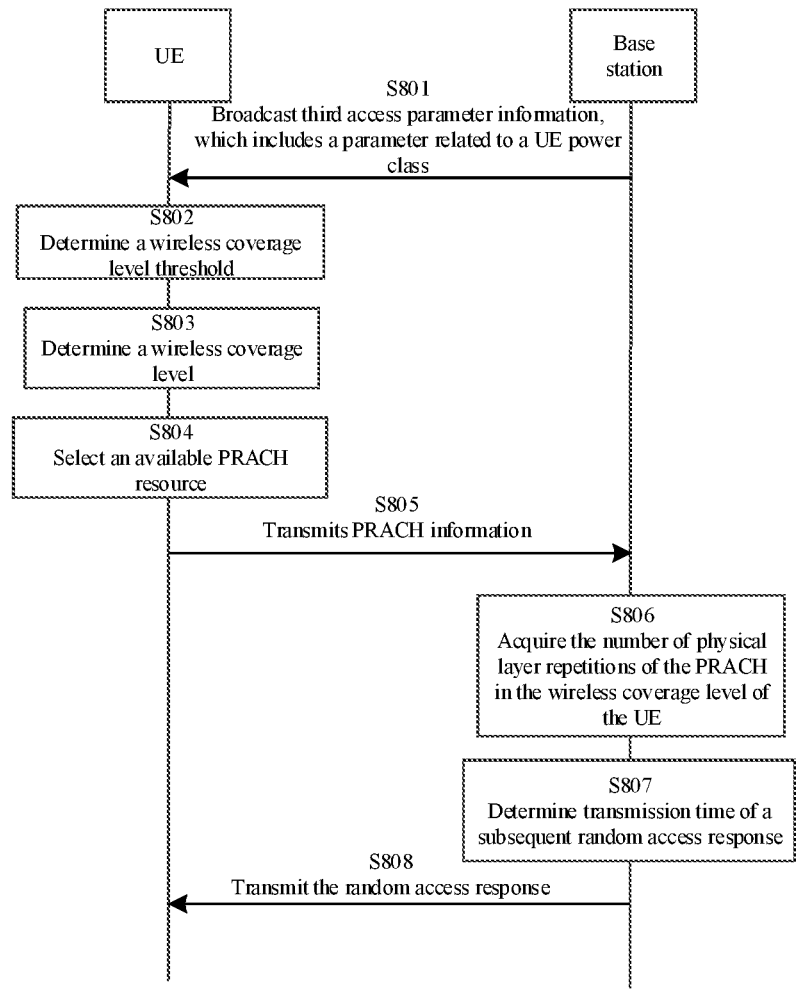
FIG. 8 is a flowchart of a wireless resource configuration method according to embodiment five of the present disclosure.

FIG. 8 is a flowchart of a wireless resource configuration method according to embodiment five of the present disclosure. As shown in FIG. 8, the wireless resource configuration method in this embodiment includes:

In step S801, a base station broadcasts third access parameter information. The third access parameter information includes a parameter related to a UE power class. The parameter related to the UE power class includes at least one of: a wireless coverage level threshold for UE power class, a PRACH resource or a number of physical layer repetitions of a PRACH configured based on a wireless coverage level.

In the embodiment shown in FIG. 7, the parameters included in the second access parameter information transmitted by the base station are irrelevant to the UE power class. The corresponding parameter needs to be further measured and determined after the UE receives the second access parameter information. In this embodiment, the third access parameter information broadcast by the base station directly includes the parameter related to the UE power class, which includes the wireless coverage level threshold for UE power class, the PRACH resource and the number of physical layer repetitions of the PRACH configured based on the wireless coverage level. The wireless coverage level threshold for UE power class is relevant to the UE power class. After receiving the third access parameter information, the UE may determine, according to its own UE power class, at leat one of the wireless coverage level threshold and a PRACH parameter corresponding to the UE power class.

In step S802, for an initial PRACH process, the UE selects the wireless coverage level threshold corresponding to the UE power class according to a matching between the UE power class and a wireless coverage level threshold list for UE power class in the broadcast.

In step S803, for the initial PRACH process, based on the step S802, the UE acquires, according to a comparison between a wireless quality measurement value and the wireless coverage level threshold, the wireless coverage level in which the UE is currently located.

In step S804, the UE selects, according to the wireless coverage level in which the UE is currently located as well as the PRACH resource and the number of physical layer repetitions of the PRACH configured based on the wireless coverage level, an available PRACH resource.

In step S805, the UE transmits PRACH information on the PRACH resource corresponding to the wireless coverage level in which the UE is currently located.

In step S806, after receiving the PRACH information, the base station receives the resource occupied by the PRACH information as well as the PRACH resource and the number of physical layer repetitions of the PRACH configured based on the wireless coverage level, and currently determines the wireless coverage level of the UE, thereby currently acquiring the number of physical layer repetitions of the PRACH in the wireless coverage level of the UE.

In step S807, the base station performs a PRACH demodulation and determines transmission time of a random access response subsequently according to the number of physical layer repetitions of the PRACH.

In step S808, the base station transmits the random access response to the UE.

The wireless coverage level RSRP threshold list configured for UE power class may be performed in the following manners. In this embodiment, only two UE power classes are differentiated, UE power class supported by LTE R13 version and UE power class newly introduced by LTE R14 version. The wireless coverage level threshold list respectively corresponds to rsrp-ThresholdsPrachInfoList-r13 and rsrp-ThresholdsP rachInfoList-r14. If the UE is the UE power class supported by LTE R13 version, then rsrp-ThresholdsPrachInfoList is a value of parameter rsrp-ThresholdsPrachInfoList-r13 when determining the wireless coverage level; and if the UE is the low power class newly introduced by LTE R14 version, rsrp-ThresholdsPrachInfo-List is a value of parameter rsrp-ThresholdsPrachInfoList-r14 when determining the wireless coverage level.

On the basis of the embodiment shown in FIG. 8, for example, the transmitted third access parameter information includes information described below. The wireless coverage level threshold list of conventional UE is configured to [−100, −120], and the wireless coverage level threshold list of low power class UE is configured to [−80, −100]. The number of physical layer repetitions of the PRACH is configured as follows: {wireless coverage level 0: 1 time, wireless coverage level 1: 8 times, and wireless coverage level 2: 32 times}. For conventional UE1 and low power class UE2 both with a same wireless quality value of 90 dBm, since the wireless coverage level threshold is different, for the conventional UE1, 90 dBm is greater than a first wireless coverage level threshold of −100, the wireless coverage level is 0 and the corresponding number of physical layer repetitions of the PRACH is 1; for the low power class UE2, 90 dBm is less than the first wireless coverage level threshold of −80 and is greater than a second threshold−100, the wireless coverage level is 1 and the corresponding number of physical layer repetitions of the PRACH is 8.

Figure 9:
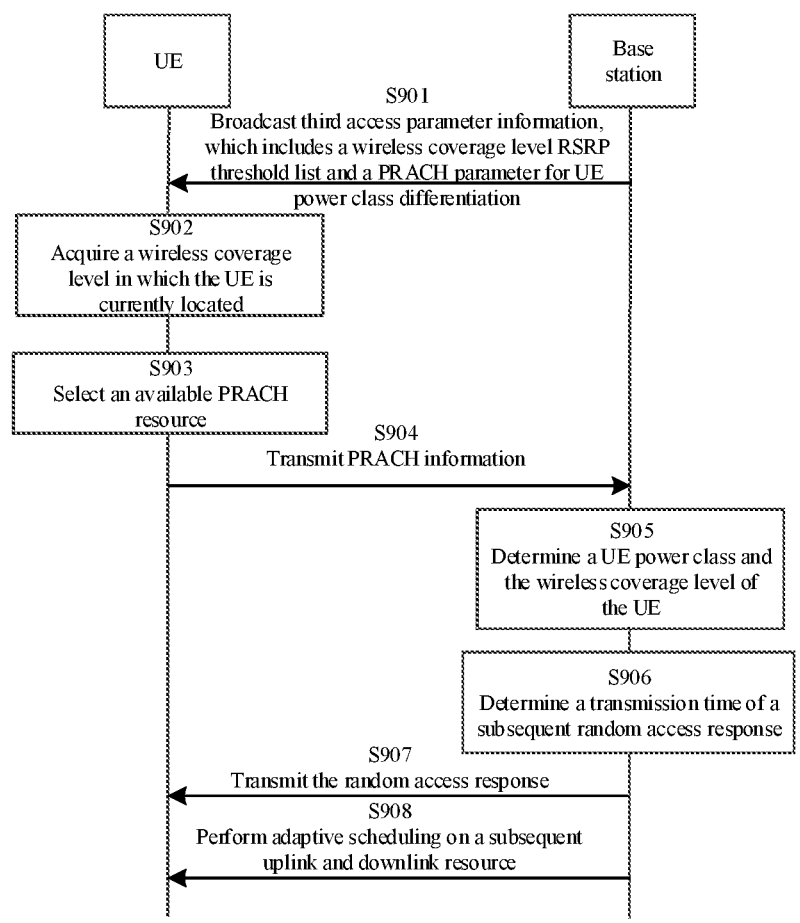
FIG. 9 is a flowchart of a wireless resource configuration method according to embodiment six of the present disclosure.

FIG. 9 is a flowchart of a wireless resource configuration method according to embodiment six of the present disclosure. As shown in FIG. 9, the wireless resource configuration method in this embodiment includes the steps described below.

In step S901, a base station broadcasts third access parameter information. The third access parameter information includes a parameter related to a UE power class. The parameter related to the UE power class includes: a wireless coverage level RSRP threshold list and a PRACH parameter for UE power class. The PRACH parameter for the UE power class includes a PRACH resource and a number of physical layer repetitions of a PRACH configured based on a UE power class and a wireless coverage level.

In step S902, for an initial PRACH process, the UE acquires, according to a comparison between a wireless quality measurement value and the wireless coverage level RSRP threshold list, the wireless coverage level in which the UE is currently located.

In step S903, the UE selects, according to the UE power class, the wireless coverage level in which the UE is currently located as well as the PRACH resource and the number of physical layer repetitions of the PRACH configured based on the wireless coverage level, an available PRACH resource.

In step S904, the UE transmits PRACH information on the PRACH resource corresponding to the wireless coverage level in which the UE is currently located.

In step S905, after receiving the PRACH information, the UE receives the resource occupied by the PRACH information and determines, based on the PRACH resource and the number of physical layer repetitions of the PRACH configured based on the wireless coverage level, the UE power class and the wireless coverage level of the UE.

In step S906, the base station performs a PRACH demodulation and determines a transmission time confirmation of a random access response subsequently according to the UE power class and the wireless coverage level of the UE.

In step S907, the base station transmits the random access response to the UE.

In step S908, the base station performs, according to the UE power class and the wireless coverage level obtained in step S905, adaptive scheduling on a subsequent uplink and downlink resource. The resource includes a physical layer resource allocation and a number of physical layer repetitions. The subsequent uplink and downlink resource includes the random access response and a resource used for subsequent signaling and data transmission.

The PRACH resource and the number of physical layer repetitions of the PRACH configured for the UE power class may be performed in the following manners. In this embodiment, only two UE power classes are differentiated: UE power class supported by LTE R13 version and UE power class introduced by LTE R14 version. The PRACH resource and the number of physical layer repetitions of the PRACH respectively correspond to nprach-ParametersList-r13 and nprach-ParametersList-r14. If the UE is the UE power class supported by LTE R13 version, then nprach-ParametersList is a value of parameter nprach-ParametersList-r13 when determining the wireless coverage level; and if the UE is the low power class newly introduced by LTE R14 version, nprach-ParametersList is a value of parameter nprach-ParametersList-r14 when determining the wireless coverage level.

Furthermore, in a multi-carrier cell, the PRACH resource (including the number of physical layer repetitions of the PRACH) with different UE power class may be configured on different carrier. When selecting a PRACH carrier, the UE preferably selects the PRACH resource corresponding to the UE power class, the selecting strategy may be, but is not limited to the following manners: the UE selects a frequency point carrying the PRACH resource of the UE power class, numbers in a frequency point order, and selects an available PRACH frequency point list of the UE. The UE calculates, based on information of a UE marker and a number of the available PRACH frequency point of the UE, a PRACH frequency point number of the UE by a predefined rule, thereby obtaining the PRACH frequency point of the UE. The predefined rule may be a rule determined based on the information of the UE marker and the number of the available PRACH frequency point of the UE. For example, the PRACH frequency point number is the number of the available PRACH frequency point of UE ID mod.

It is assumed that a multi-frequency-point cell includes four frequency points capable of carrying the PRACH. Frequency point A0/A1 can only carry the PRACH of the conventional power class UE. Frequency point B0/B1 can only carry the PRACH of the low power class UE. The predefined rule is the number of the available PRACH frequency point of the UE ID mod. When selecting the PRACH, the conventional power class UE firstly selects a frequency point list {A0, A1} capable of carrying the PRACH of the conventional power class UE, then selects, based on the UE marker, the PRACH frequency point in the predefined rule. When the UE marker is an even number, frequency point A0 (even number mod 2=0) is selected; and when the UE marker is an odd number, frequency point A1 (even number mod 2=1) is selected. When selecting the PRACH, the low power class UE firstly selects a frequency point list {B0, B1} capable of carrying the PRACH of the low power class UE, then selects, based on the UE marker, the PRACH frequency point in the predefined rule. When the UE marker is the even number, frequency point B0 (even number mod 2=0) is selected; and when the UE marker is the odd number, frequency point B1 (even number mod 2=1) is selected.

In addition, the embodiments in FIGS. 8 and 9 may be combined. That is, the third access parameter information broadcast by the base station includes the wireless coverage level RSRP threshold list configured for UE power class and the PRACH parameter for the UE power class. The PRACH parameter for the UE power class includes the PRACH resource and the number of physical layer repetitions of the PRACH configured based on the UE power class and the wireless coverage level, which is equal to use the wireless coverage level RSRP threshold list configured for UE power class as well as the PRACH resource and the number of physical layer repetitions of the PRACH configured based on the UE power class and the wireless coverage level at the same time, making the wireless parameter configuration more flexible.

After combining the embodiments shown in FIGS. 8 and 9, the wireless parameter configuration method may be further described according to the following embodiment: conventional power class UE (20 dBm) is configured with two wireless coverage level RSRP thresholds [threshold 0(−120 dBm), threshold 1(−130 dBm)]. For the conventional power class UE, a coverage in which the RSRP value is greater than or equal to the threshold 0 is coverage level 0; a coverage in which the RSRP value is less than the threshold 0 and greater than or equal to the threshold 1 is coverage level 1; and a coverage in which the RSRP value is less than the threshold 1 is coverage level 2. The low power class UE (14 dBm) is configured with three wireless coverage level RSRP thresholds [threshold 0(−114 dBm), threshold 1(−124 dBm), threshold 2(−134 dBm)]. For the low power class UE: the coverage in which the RSRP value is greater than or equal to the threshold 0 is coverage level 0; the coverage in which the RSRP value is less than the threshold 0 and greater than or equal to the threshold 1 is coverage level 1; and a coverage in which the RSRP value is less than the threshold 1, and greater than or equal to the threshold 2 is coverage level 2, a coverage in which the RSRP value is less than the threshold 2 is coverage level 3. The resource configured for the coverage level 0, the coverage level 1 and the coverage level 2 may be used by the conventional power class UE (20 dBm) and the low power class UE (14 dBm). The resource configured for the coverage level 3 may only be used by the low power class UE (14 dBm).

Figure 10:
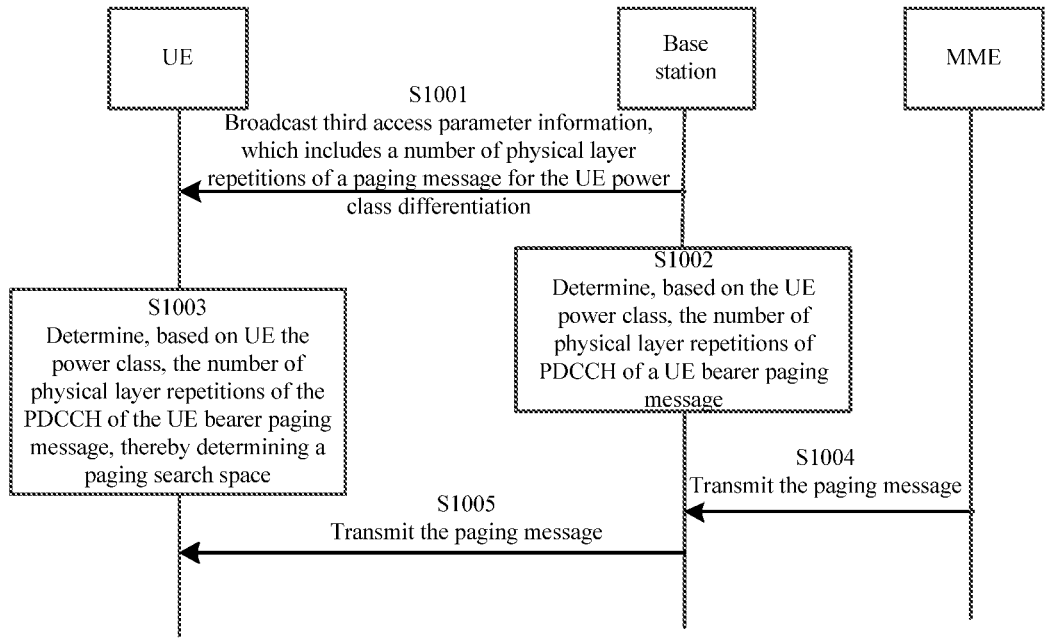
FIG. 10 is a flowchart of a wireless resource configuration method according to embodiment seven of the present disclosure.

FIG. 10 is a flowchart of a wireless resource configuration method according to embodiment seven of the present disclosure. As shown in FIG. 10, the wireless resource configuration method in this embodiment includes:

In step S1001, a base station broadcasts third access parameter information, the third access parameter information includes a parameter related to a UE power class, the parameter related to the UE power class includes at least one of: a wireless coverage level threshold for UE power class, a PRACH parameter for the UE power class, or a maximum number of physical layer repetitions of the PDCCH of bearer paging scheduling information for the UE power class. The maximum number of physical layer repetitions of the PDCCH of the bearer paging scheduling information for the UE power class is used for indicating a maximum number of physical layer repetitions of the PDCCH of a paging message of different UE power class.

In step S1002, the base station determines, based on the UE power class, the maximum number of physical layer repetitions of the PDCCH of a UE bearer paging message.

In step S1003, the base station determines, based on the power class, the maximum number of physical layer repetitions of the PDCCH of the UE bearer paging message, thereby determining a paging search space. The UE determines according to its own UE power class information when performing a paging reception. The conventional power class UE determines the paging search space and performs the paging reception according to the maximum number of physical layer repetitions of the PDCCH of the paging message. The low power class UE determines the paging search space and performs the paging reception according to the maximum number of physical layer repetitions of the PDCCH of the paging message of the low power class UE.

In step S1004, a mobility management entity transmits the paging message to the base station, and carries the UE power class information.

The method of acquiring the UE power class by the MME may be a value extension of reporting the power class by the UE to the MME in the Rel-13 NB-IoT. The Rel-13 NB-IoT only currently reports whether it is a power class of 20 dBm. If the Rel-13 NB-IoT does not report, it is considered as a power class of 23 dBm. When introducing a power class of 14 dBm, in the exemplary manner, the Rel-13 NB-IoT may report whether it is the power class of 20 dBm or the power class of 14 dBm. If the Rel-13 NB-IoT does not report, it is considered as the power class of 23 dBm.

In step S1005, the base station transmits the paging message to the UE. The UE receives and transmits the paging based on the maximum number of physical layer repetitions of the PDCCH of the bearer paging message determined by the power class.

The maximum number of physical layer repetitions of the PDCCH of the paging message configured for the UE power class may be performed in the following manners. In this embodiment, only two UE power classes are differentiated: UE power class supported by LTE R13 version and UE power class introduced by LTE R14 version. The maximum number of physical layer repetitions of the PDCCH of the paging message respectively corresponds to npdcch-NumRepetitionPaging-r13 and npdcch-NumRepetitionPaging-r14. If the UE is the UE power class supported by LTE R13 version, the maximum number of physical layer repetitions of the PDCCH of the paging message is the value of parameter npdcch-NumRepetitionPaging-r13. If the UE is low power class newly introduced by LTE R14 version, the maximum number of physical layer repetitions of the PDCCH of the paging message is the value of parameter npdcch-NumRepetitionPaging-r14.

Figure 11:
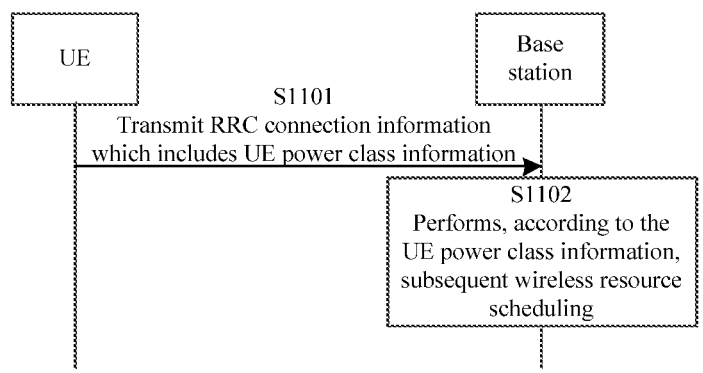
FIG. 11 is a flowchart of a wireless resource configuration method according to embodiment eight of the present disclosure.

FIG. 11 is a flowchart of a wireless resource configuration method according to embodiment eight of the present disclosure. As shown in FIG. 11, the wireless resource configuration method in this embodiment includes:

In step S1101, UE transmits radio resource control (RRC) connection information to a base station. The RRC connection information includes UE power class information. The UE power class information includes at least one of: a UE power class value, indication information on whether the UE is low power class UE, or a downlink wireless coverage level of low power class UE.

In step S1102, the base station performs, according to the UE power class information, subsequent wireless resource scheduling.

This embodiment provides an exemplary of reporting the UE power class to the base station by the UE by the RRC connection information. The method of carrying the UE power class by the RRC connection information may be reported by RRC signaling or an indication domain of a MAC control unit. The reported content may be: whether the UE is the low power class UE newly added by R14, or a specific value of the UE power class, or a combination of a UE power class indication and the downlink wireless coverage level of the low power class UE. The RRC connection information includes at least one of RRC connection request information, RRC connection resume request information, or RRC connection reestablishment request information.

Reporting the UE power class by the RRC signaling may be in the following manner: adding a low power class UE indication element uePowerClass6Ind-R14 to a RRC connection request message. If the indication element exists in the message, the UE is the low power class UE; otherwise, the UE is conventional power class UE. Alternatively, the indication element may also be the specific value of the UE power class (such as power class 3, power class 5, and power class newly added by R14), or a value reporting the combination of UE power class indication and the downlink wireless coverage level of the low power class UE, such as 0 represents wireless coverage level 0 of the low power class UE, 1 represents wireless coverage level 1 of the low power class UE, 2 represents wireless coverage level 2 of the low power class UE and 3 represents non-low-power-class-UE.

The low power class UE may adopt the method of determining the wireless coverage level by the non-low-power-class-UE when determining the downlink wireless coverage level.

Figure 12:
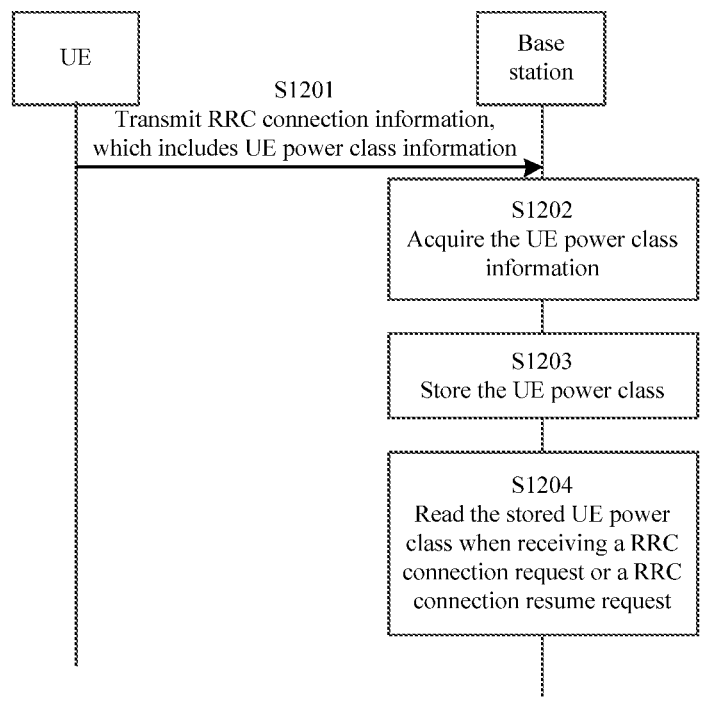
FIG. 12 is a flowchart of a wireless resource configuration method according to embodiment nine of the present disclosure.

FIG. 12 is a flowchart of a wireless resource configuration method according to embodiment nine of the present disclosure. As shown in FIG. 12, the wireless resource configuration method in this embodiment includes:

In step S1201, the UE transmits radio resource control (RRC) connection information to a base station (such as a RRC connection request, a RRC connection resume request, a RRC connection reestablishment request, a RRC connection establishment complete, RRC connection resume complete, RRC connection reestablishment complete or UE capability information). The RRC connection information includes UE power class information. The UE power class information includes a UE power class value or indication information on whether the UE is low power class UE.

In step S1202, the base station acquires the UE power class information.

In step S1203, the base station stores the UE power class.

In step S1204, the base station reads, when receiving the RRC connection request or the RRC connection resume request, or the RRC connection reestablishment request, the stored UE power class.

After determining the UE power class, the base station may also store the UE power class. In this case, when receiving the RRC connection information (the RRC connection request or the RRC connection resume request, or the RRC connection reestablishment request) transmitted by the UE again, the base station may acquire the UE power class information from the stored information, then perform, according to the UE power class information, the subsequent uplink resource scheduling, such as considering the UE power class information when determining the number of physical layer repetitions of the uplink transmission.

It is to be noted that the wireless coverage level, the wireless coverage level threshold value and the wireless coverage measurement value in the embodiments described above may all be represented by the RSRP value.

Figure 13:
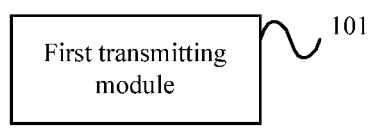
FIG. 13 is a structural diagram of a wireless resource configuration device according to embodiment one of the present disclosure.

FIG. 13 is a structural diagram of a wireless resource configuration device according to embodiment one of the present disclosure. As shown in FIG. 13, the wireless resource configuration device of this embodiment includes:

a first transmitting module 101, which is configured to broadcast first access parameter information. The first access parameter information is configured based on a UE power class and is configured to enable the UE to select an access parameter according to the UE power class.

On the basis of the embodiment shown in FIG. 13, the first access parameter information may include at least one parameter of a group consisting of: a UE maximum transmit power applicable to a cell and configured for UE power class, a UE maximum transmit power applicable to a frequency band and configured for UE power class, a minimum receiving level value of the cell configured for UE power class, a minimum quality value of the cell configured for UE power class, a minimum quality threshold configured to initiate a PRACH process and configured for UE power class, a UE maximum transmit power offset applicable to the cell and configured for UE power class, a UE maximum transmit power offset applicable to the frequency band and configured for UE power class, a minimum receiving level value offset of the cell configured for UE power class, a minimum quality value offset of the cell configured for UE power class, a minimum quality threshold offset configured to initiate the PRACH process and configured for UE power class, a reference signal receiving power (RSRP) threshold defined for low power class UE to access the cell, and a reference signal receiving quality threshold defined for the low power class UE to access the cell. The access parameter included in the first access parameter information is set to a corresponding predefined default value, which may include:

a default value of the UE maximum transmit power applicable to the cell and configured for UE power class is set to a default value of a UE maximum transmit power applicable to the cell of the low power class UE;

a default value of the UE maximum transmit power applicable to the frequency band and configured for UE power class is set to a default value of a UE maximum transmit power applicable to a frequency band of the low power class UE;

a default value of the minimum receiving level value of the cell configured for UE power class is set to a default value of a minimum receiving level value of the cell of the low power class UE;

a default value of the minimum quality value of the cell configured for UE power class is set to a default value of a minimum quality value of the cell of the low power class UE;

a default value of the UE maximum transmit power offset applicable to the cell and configured for UE power class is set to a default value of a UE maximum transmit power offset applicable to the cell of the low power class UE;

a default value of the UE maximum transmit power offset applicable to the frequency band and configured for UE power class is set to a default value of a UE maximum transmit power offset applicable to the frequency band of the low power class UE;

a default value of the minimum receiving level value offset of the cell configured for UE power class is set to a default value of a minimum receiving level value offset of the cell of the low power class UE;

a default value of the minimum quality value offset of the cell configured for UE power class is set to a default value of a minimum quality value offset of the cell of the low power class UE;

a default value of the RSRP threshold defined for the low power class UE to access the cell is set to a default value of an RSRP threshold of the low power class UE to access the cell; and a default value of the RSRQ threshold defined for the low power class UE to access the cell is set to a default value of an RSRQ threshold of the low power class UE to access the cell.

Figure 14:
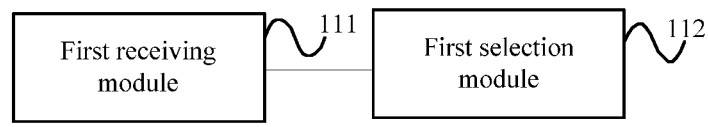
FIG. 14 is a structural diagram of a wireless resource configuration device according to embodiment two of the present disclosure.

FIG. 14 is a structural diagram of a wireless resource configuration device according to embodiment two of the present disclosure. As shown in FIG. 14, the wireless resource configuration device in this embodiment includes:

a first receiving module 111, which is configured to receive first access parameter information broadcast by a base station; where the first access parameter information is configured based on a UE power class; and a first selection module 112, which is configured to select an access parameter corresponding to the UE power class of the UE in the first access parameter information.

Figure 15:
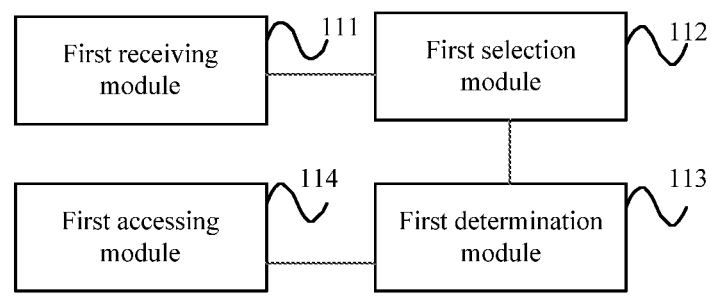
FIG. 15 is a structural diagram of a wireless resource configuration device according to embodiment three of the present disclosure.

FIG. 15 is a structural diagram of a wireless resource configuration device according to embodiment three of the present disclosure. As shown in FIG. 15, the wireless resource configuration device of this embodiment on the basis of FIG. 14 may also include:

a first determination module 113, which is configured to use a S criterion selected by a cell, and determine, according to an access parameter corresponding to a UE power class of UE, whether the cell provided by a base station fulfills a camp condition; and a first accessing module 114, which is configured to access the cell if the cell provided by the base station fulfills the camp condition, and not to access the cell if the cell provided by the base station does not fulfill the camp condition.

On the basis of the embodiment in FIG. 14 or FIG. 15, the first access parameter information may include at least one parameter of a group consisting of: a UE maximum transmit power applicable to a cell and configured for UE power class, a UE maximum transmit power applicable to a frequency band and configured for UE power class, a minimum receiving level value of the cell configured for UE power class, a minimum quality value of the cell configured for UE power class, a minimum quality threshold configured to initiate a PRACH process and configured for UE power class, a UE maximum transmit power offset applicable to the cell and configured for UE power class, a UE maximum transmit power offset applicable to the frequency band and configured for UE power class, a minimum receiving level value offset of the cell configured for UE power class, a minimum quality value offset of the cell configured for UE power class, a minimum quality threshold offset configured to initiate the PRACH process and configured for UE power class, a reference signal receiving power (RSRP) threshold defined for low power class UE to access the cell, and a reference signal receiving quality threshold defined for the low power class UE to access the cell.

For the access parameter in the first access parameter information, it is to be noted that:

the UE maximum transmit power applicable to the cell and configured for UE power class is used for acquiring a UE maximum transmit power applicable to the cell corresponding to the UE according to the UE power class of the UE, and the UE maximum transmit power applicable to the cell is used for determining whether the S criterion for cell selection is met;

the UE maximum transmit power applicable to the frequency band and configured for UE power class is used for acquiring a UE maximum transmit power applicable to the frequency band corresponding to the UE according to the UE power class of the UE, and the UE maximum transmit power applicable to the frequency band is used for determining whether the S criterion for cell selection is met;

the minimum receiving level value of the cell configured for UE power class is used for acquiring a minimum receiving level value of the cell to have the UE to reside according to the UE power class of the UE, and the minimum receiving level value of the cell to have the UE to reside is used for determining whether the S criterion for cell selection is met;

the minimum quality value of the cell configured for UE power class is used for acquiring a minimum quality value of the cell to have the UE to reside according to the UE power class, and the minimum quality value of the cell to have the UE to reside is used for determining whether the S criterion for cell selection is met;

the UE maximum transmit power offset applicable to the cell and configured for UE power class is used for calculating a maximum transmit power applicable to the cell for UE power class; where a maximum transmit power of the low power class UE applicable to the cell is a sum of a maximum transmit power of conventional power class UE applicable to the cell of a cell broadcast and the maximum transmit power offset of the low power class UE applicable to the cell;

the UE maximum transmit power offset applicable to the frequency band and configured for UE power class is used for calculating a maximum transmit power applicable to the frequency band for UE power class; where a maximum transmit power of the low power class UE applicable to the frequency band is a sum of the maximum transmit power of conventional power class UE applicable to the frequency band of the cell broadcast and the maximum transmit power offset of the low power class UE applicable to the frequency band;

the minimum receiving level value offset of the cell configured for UE power class is used for calculating the minimum receiving level value of the cell for UE power class; where the minimum receiving level value of the cell to have the low power class UE to reside is a sum of a minimum receiving level value of the cell to have the conventional power class UE of the cell broadcast to reside and the minimum receiving level value offset of the cell to have the low power class UE to reside; and the minimum quality value offset of the cell configured for UE power class is used for calculating the minimum quality value of the cell for UE power class; wherein the minimum quality value of the cell to have the low power class UE to reside is a sum of a minimum quality value of the cell to have the conventional power class UE of the cell broadcast to reside and the minimum quality value offset of the cell to have the low power class UE to reside.

It is to be further noted that:

if the UE maximum transmit power applicable to the cell and configured for UE power class is defined in a broadcast message and that the broadcast message does not comprise a parameter value of the UE maximum transmit power applicable to the cell of the low power class UE, the parameter value of the UE maximum transmit power applicable to the cell of the low power class UE is set to a default value of the UE maximum transmit power applicable to the cell of the low power class UE;

if the UE maximum transmit power applicable to the frequency band and configured for UE power class is defined in a broadcast message, and that the broadcast message does not comprise a parameter value of the UE maximum transmit power applicable to the frequency band of the low power class UE, the parameter value of the UE maximum transmit power applicable to the frequency band of the low power class UE is set to a default value of the UE maximum transmit power applicable to the frequency band of the low power class UE;

if the minimum receiving level value of the cell configured for UE power class is defined in a broadcast message, and that the broadcast message does not comprise a parameter value of the minimum receiving level value of the cell of the low power class UE, the parameter value of the minimum receiving level value of the cell of the low power class UE is set to a default value of the minimum receiving level value of the cell of the low power class UE;

if the minimum quality value of the cell configured for UE power class is defined in a broadcast message, and that the broadcast message does not comprise a parameter value of the minimum quality value of the cell of the low power class UE, the parameter value of the minimum quality value of the cell of the low power class UE is the default value of the minimum quality value of the cell of the low power class UE;

if the UE maximum transmit power offset applicable to the cell and configured for UE power class is defined in a broadcast message, and that the broadcast message does not comprise a parameter value of the UE maximum transmit power offset applicable to the cell of the low power class UE, the parameter value of the UE maximum transmit power offset applicable to the of the low power class UE is set to a default value of the UE maximum transmit power offset applicable to the of the low power class UE;

if the UE maximum transmit power offset applicable to the frequency band and configured for UE power class is defined in a broadcast message, and that the broadcast message does not comprise a parameter value of the UE maximum transmit power offset applicable to the frequency band of the low power class UE, the parameter value of the UE maximum transmit power offset applicable to the frequency band of the low power class UE is set to a default value of the UE maximum transmit power offset applicable to the frequency band of the low power class UE;

if the minimum receiving level value offset of the cell configured for UE power class is defined in a broadcast message, and that the broadcast message does not comprise a parameter value of the minimum receiving level value of the cell of the low power class UE, the parameter value of the minimum receiving level value offset of the cell of the low power class UE is set to a default value of the minimum receiving level value offset of the cell of the low power class UE; and if the minimum quality value offset of the cell configured for UE power class is defined in a broadcast message, and that the broadcast message does not comprise a parameter value of the minimum quality value offset of the cell of the low power class UE, the parameter value of the minimum quality value offset of the cell of the low power class UE is set to a default value of the minimum quality value offset of the cell of the low power class UE.

Figure 16:
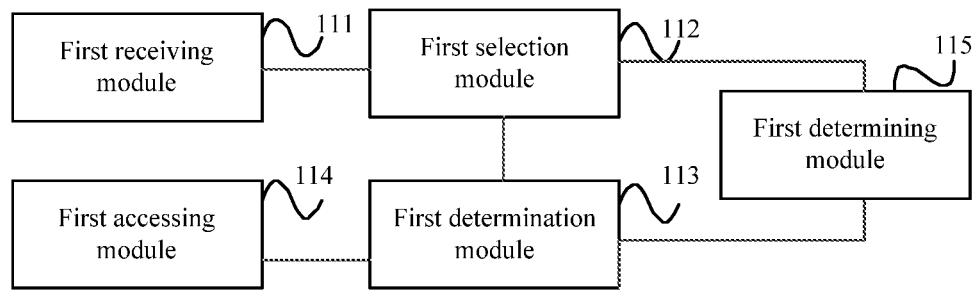
FIG. 16 is a structural diagram of a wireless resource configuration device according to embodiment four of the present disclosure.

FIG. 16 is a structural diagram of a wireless resource configuration device according to embodiment four of the present disclosure. As shown in FIG. 16, the wireless resource configuration device of this embodiment on the basis of FIG. 15 may also include:

a first determining module 115, which is configured to determine a minimum quality threshold applicable to initiate a PRACH process according to a UE power class of UE;

a first determination module 113, which is further configured to determine whether a cell quality is currently greater than or equal to the minimum quality threshold applicable to initiate the PRACH process;

a first accessing module 114, which is further configured to initiate the PRACH process if the cell quality is currently greater than or equal to the minimum quality threshold configured to initiate the PRACH process, and not initiate the PRACH process if the cell quality is currently less than the minimum quality threshold configured to initiate the PRACH process.

When a first receiving module 111 does not receive any parameter configured for UE power class, the first determination module 113 may also be configured to determine whether the cell quality is currently greater than or equal to a preset default value corresponding to the minimum quality threshold configured to initiate the PRACH process; and the first accessing module 114 is further configured to initiate the PRACH process if the cell quality is currently greater than or equal to the preset default value, and not initiate the PRACH process if the cell quality is currently less than the preset default value.

In this embodiment, exemplarily, the minimum quality threshold applicable to initiate the PRACH process may only be defined according to a cell not supporting low power class UE signaling, and minimum quality threshold applicable to initiate the PRACH process may be a predefined default value.

Exemplarily, the first determination module 113 may be further configured to determine whether the cell quality is currently greater than or equal to the minimum quality threshold of the cell not supporting low power class UE signaling to initiate the PRACH process for the cell not supporting low power class UE signaling.

The first accessing module 114 may be configured to initiate the PRACH process at the cell if the cell quality is currently greater than or equal to the minimum quality threshold of the cell not supporting low power class UE signaling to initiate the PRACH process; and not initiate the PRACH process at the cell if the cell quality is currently less than the minimum quality threshold of the cell not supporting low power class UE signaling to initiate the PRACH process.

The cell not supporting low power class UE signaling is determined according to whether a parameter or an indication for configuring the low power class UE is included in a cell broadcast. If the parameter or the indication for configuring the low power class UE is not included in the cell broadcast, the UE confirms the cell as the cell not supporting low power class UE.

Figure 17:
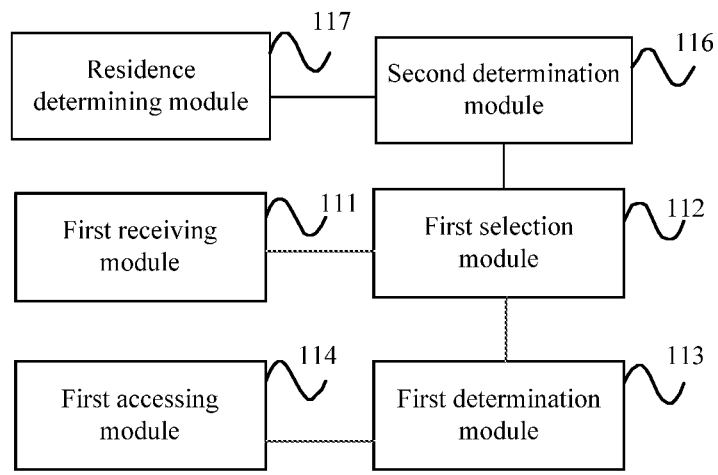
FIG. 17 is a structural diagram of a wireless resource configuration device according to embodiment five of the present disclosure.

FIG. 17 is a structural diagram of a wireless resource configuration device according to embodiment five of the present disclosure. As shown in FIG. 17, the wireless resource configuration device of this embodiment on the basis of FIG. 15 may also include: a second determination module 116 and a residence determining module 117.

The second determination module 116 is configured to execute at least one of: determining whether a cell quality is currently greater than or equal to a RSRP threshold of low power class UE to access the cell; determining whether the cell quality is currently greater than or equal to a RSRQ threshold of low power class UE to access the cell; or determining whether the cell quality is currently greater than or equal to the RSRP threshold and the RSRQ threshold of low power class UE to access the cell.

The residence determining module 117 is configured to execute at least one of:

if the cell quality is currently greater than or equal to the RSRP threshold of low power class UE to access the cell, whether a current cell fulfills a camp condition is determined according to a S criterion selected by the current cell; and if the cell quality is currently less than the RSRP threshold of the low power class UE to access the cell, a reselection priority of the current cell is reduced or the current cell is confirmed as being unacceptable for camping;

if the cell quality is currently greater than or equal to the RSRQ threshold of the low power class UE to access the cell, whether the current cell fulfills the camp condition is determined according to the S criterion selected by the current cell; and if the cell quality is currently less than the RSRQ threshold of the low power class UE to access the cell, the reselection priority of the current cell is reduced or the current cell is confirmed as being unacceptable for camping; or if the cell quality is currently greater than or equal to the RSRP threshold and RSRQ threshold of the low power class UE to access the cell, whether the current cell fulfills the camp condition is determined according to the S criterion selected by the current cell; and if the cell quality is currently less than the RSRP threshold and RSRQ threshold of the low power class UE to access the cell, the reselection priority of the current cell is reduced or the current cell is confirmed as being unacceptable for camping.

In this embodiment, exemplarily, the residence determining module 117 is configured to reduce the reselection priority of the current cell in at least one of manners:

selecting firstly a cell in which the cell quality is greater than or equal to the RSRP threshold of the low power class UE to access the cell to reside; and when there is no other cells in which the cell quality is greater than or equal to the RSRP threshold of the low power class UE to access the cell, selecting the cell in which the cell quality is less than the RSRP threshold of the low power class UE to access the cell to reside;

selecting firstly the cell in which the cell quality is greater than or equal to the RSRQ threshold of the low power class UE to access the cell to reside; and when there is no other cells in which the cell quality is greater than or equal to the RSRQ threshold of the low power class UE to access the cell, selecting the cell in which the cell quality is less than the RSRQ threshold of the low power class UE to access the cell to reside; or selecting firstly the cell in which the cell quality is greater than or equal to the RSRP threshold and the RSRQ threshold of the low power class UE to access the cell to reside; and when there is no other cells in which the cell quality is greater than or equal to the RSRP threshold and the RSRQ threshold of the low power class UE to access the cell, selecting the cell in which the cell quality is less than the RSRP threshold and the RSRQ threshold of the low power class UE to access the cell to reside.

Correspondingly, the residence determining module 117 may be configured to confirm that the current cell is unacceptable for camping in the following manners: confirming the current cell is in an access barred status, and excluding the current cell when the cell selects and reselects.

Exemplarily, when the first receiving module 111 does not receive at least one parameter of the RSRP threshold and the RSRQ threshold of the low power class UE to access the cell, at least one of the RSRP threshold or the RSRQ threshold of the low power class UE to access the cell is a predefined default value.

In this embodiment, exemplarily, at least one of the RSRP threshold or the RSRQ threshold of the low power class UE to access the cell is predefined only according to the cell not supporting low power class UE signaling, and at least one of the RSRP threshold or the RSRQ threshold of the low power class UE to access the cell is the predefined default value.

Exemplarily, the second determination module 116 is further configured to determine, for the cell not supporting low power class UE signaling, whether the cell quality is currently greater than or equal to a predefined value of the RSRP threshold and the RSRQ threshold of the low power class UE to access the cell.

The residence determining module 117 may be further configured to execute at least one of:

if the cell quality is currently greater than or equal to predefined value of the RSRP threshold of the low power class UE to access the cell, whether the current cell fulfills the camp condition is determined according to the S criterion selected by the current cell; and if the cell quality is currently less than the predefined value of the RSRP threshold of the low power class UE to access the cell, the reselection priority of the current cell is reduced or the current cell is confirmed as being unacceptable for camping;

if the cell quality is currently greater than or equal to predefined value of the RSRQ threshold of the low power class UE to access the cell, whether the current cell fulfills the camp condition is determined according to the S criterion selected by the current cell; and if the cell quality is currently less than the predefined value of the RSRQ threshold of the low power class UE to access the cell, the reselection priority of the current cell is reduced or the current cell is confirmed as being unacceptable for camping; or if the cell quality is currently greater than or equal to the predefined value of the RSRP threshold and RSRQ threshold of the low power class UE to access the cell, whether the current cell fulfills the camp condition is determined according to the S criterion selected by the current cell; and if the cell quality is currently less than the predefined value of the RSRP threshold or the RSRQ threshold of the low power class UE to access the cell, the reselection priority of the current cell is reduced or the current cell is confirmed as being unacceptable for camping.

Exemplarily, the cell not supporting low power class UE signaling determines according to whether a parameter or an indication for configuring the low power class UE is included in a cell broadcast. If no parameter or indication for configuring the low power class UE is included in the cell broadcast, the cell is confirmed as the cell not supporting low power class UE.

Figure 18:
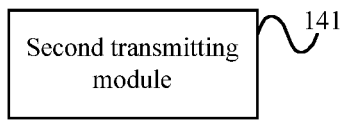
FIG. 18 is a structural diagram of a wireless resource configuration device according to embodiment six of the present disclosure.

FIG. 18 is a structural diagram of a wireless resource configuration device according to embodiment six of the present disclosure. As shown in FIG. 18, the wireless resource configuration device in this embodiment includes:

a second transmitting module 141, which is configured to transmit second access parameter information to UE. The second access parameter information includes a parameter for enabling the UE to acquire a wireless coverage level and is configured to enable the UE to determine the wireless coverage level according to a UE power class.

On the basis of the embodiment shown in FIG. 18, the second transmitting module 141 may be configured to broadcast the second access parameter information. The second access parameter information includes at least one of: a wireless coverage level threshold, a PRACH parameter configured based on a wireless coverage level, or a wireless coverage level threshold offset based on a UE power class.

Figure 19:
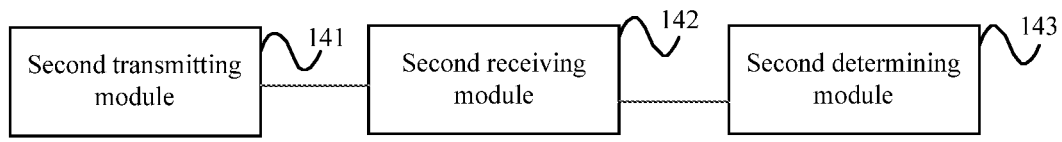
FIG. 19 is a structural diagram of a wireless resource configuration device according to embodiment seven of the present disclosure.

FIG. 19 is a structural diagram of a wireless resource configuration device according to embodiment seven of the present disclosure. As shown in FIG. 19, the wireless resource configuration device of this embodiment on the basis of FIG. 18 may also include:

a second receiving module 142, which is configured to receive PRACH preamble information transmitted by UE;

a second determining module 143, which is configured to determine, according to a resource used for transmitting the PRACH preamble information, a wireless coverage level of the UE; and determine to transmit a number of physical layer repetitions of the PDCCH according to the wireless coverage level of the UE.

On the basis of the embodiment shown in FIG. 19, the second receiving module 142 may be further configured to receive RRC connection information transmitted by the UE. The RRC connection information includes at least one of: a UE power class of the or and a downlink wireless coverage level of low power class UE. The second determining module 143 may be further configured to determine, according to at least one of the UE power class of the UE or the downlink wireless coverage level of the low power class UE, to transmit the number of physical layer repetitions of the PDCCH.

On the basis of the embodiment shown in FIG. 19, the RRC connection information may include at least one of: RRC connection request information, RRC connection resume request information, or RRC connection reestablishment request information. The at least one of the UE power class of the UE or the downlink wireless coverage level of the low power class UE included in the RRC connection information may be reported by RRC signaling or a MAC control unit in the RRC connection information.

On the basis of the embodiment shown in FIG. 18, a second transmitting module 141 may be configured to transmit the second access parameter information to the UE by a PDCCH order. The second access parameter information includes an uplink coverage level and a downlink coverage level of the UE, or the second access parameter information includes the uplink coverage level and the number of physical layer repetitions of the PDCCH of the UE.

Figure 20:
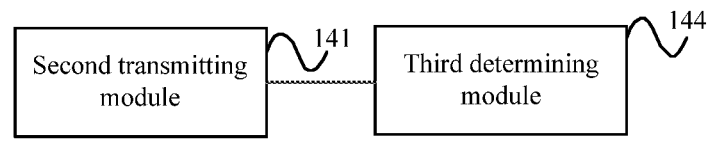
FIG. 20 is a structural diagram of a wireless resource configuration device according to embodiment eight of the present disclosure.

FIG. 20 is a structural diagram of a wireless resource configuration device according to embodiment eight of the present disclosure. As shown in FIG. 20, the wireless resource configuration device of this embodiment on the basis of FIG. 18 may also include:

a third determining module 144, which is configured to determine, according to a downlink coverage level of UE in second access parameter information, to transmit a number of physical layer repetitions of a PDCCH to the UE, or determine, according to the number of physical layer repetitions of the PDCCH in the second access parameter information, to transmit the number of physical layer repetitions of the PDCCH to the UE.

Figure 21:
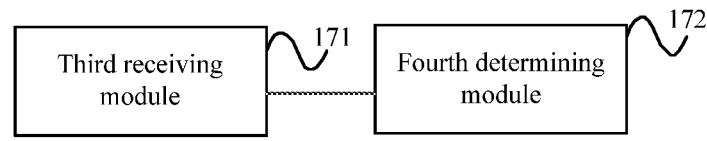
FIG. 21 is a structural diagram of a wireless resource configuration device according to embodiment nine of the present disclosure.

FIG. 21 is a structural diagram of a wireless resource configuration device according to embodiment nine of the present disclosure. As shown in FIG. 21, the wireless resource configuration device in this embodiment includes:

a third receiving module 171, which is configured to receive second access parameter information transmitted by a base station. The second access parameter information includes a parameter for enabling the UE to learn a wireless coverage level;

a fourth determining module 172, which is configured to determine, according to a UE power class of the UE and the second access parameter information, the wireless coverage level of the UE; and determine, according to the wireless coverage level, a resource used for PRACH.

On the basis of the embodiment shown in FIG. 21, the third receiving module 171 may be configured to receive the second access parameter information broadcast by the base station. The second access parameter information includes at least one of: a wireless coverage level threshold, a PRACH parameter configured based on the wireless coverage level, or a wireless coverage level threshold offset based on the UE power class. The fourth determining module 172 may be configured to compare a wireless coverage measurement value with the wireless coverage level threshold, if the UE power class of the UE is a low power class, the wireless coverage level of the UE is determined as the wireless coverage level obtained by comparison subtracted by one; otherwise, the wireless coverage level of the UE is determined as the wireless coverage level obtained by comparison; or if the UE power class of the UE is the low power class, the UE compares the wireless coverage measurement value with the wireless coverage level threshold added by a predefined offset value. If the UE power class of the UE is not the low power class, the UE compares the wireless coverage measurement value with the wireless coverage level threshold. The UE then determines the wireless coverage level of the UE as the wireless coverage level obtained by comparison.

In the embodiment shown in FIG. 21, the predefined offset value may be a value defined by a network by default or a wireless coverage level threshold offset value transmitted by an eNB to the UE by a broadcast message.

Figure 22:
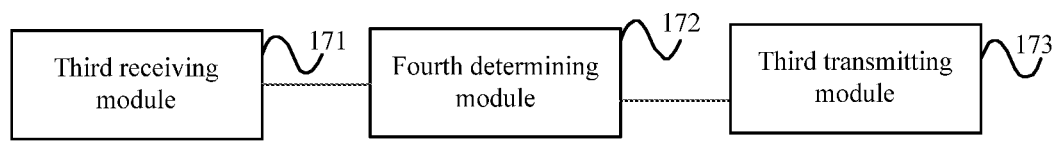
FIG. 22 is a structural diagram of a wireless resource configuration device according to embodiment ten of the present disclosure.

FIG. 22 is a structural diagram of a wireless resource configuration device according to embodiment ten of the present disclosure. As shown in FIG. 22, the wireless resource configuration device of this embodiment on the basis of FIG. 21 may also include:

a third transmitting module 173, which is configured to use a resource to transmit PRACH preamble information to a base station, and enable the base station to determine, according to the resource used for transmitting the PRACH preamble information, a wireless coverage level of UE.

Figure 23:
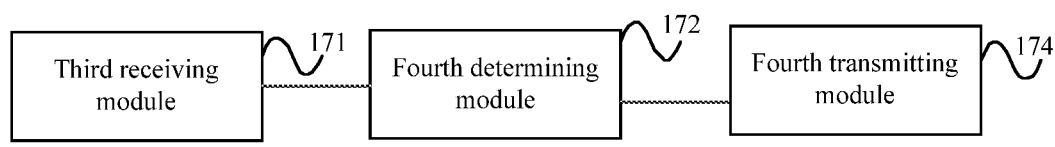
FIG. 23 is a structural diagram of a wireless resource configuration device according to embodiment eleven of the present disclosure.

FIG. 23 is a structural diagram of a wireless resource configuration device according to embodiment eleven of the present disclosure. As shown in FIG. 23, the wireless resource configuration device of this embodiment on the basis of FIG. 21 may also include:

a fourth transmitting module 174, which is configured to transmit RRC connection information to a base station, where the RRC connection information includes at least one of: a UE power class of the UE, or a downlink wireless coverage level of low power class UE; and enable the base station, according to at least one of the UE power class of the UE or the downlink wireless coverage level of the low power class UE, to determine to transmit a number of physical layer repetitions of a PDCCH to the UE.

On the basis of the embodiment shown in FIG. 23, the RRC connection information may include at least one of: RRC connection request information, RRC connection resume request information, or RRC connection reestablishment request information. The at least one of the UE power class of the UE or the downlink wireless coverage level of the low power class UE included in the RRC connection information may be reported by RRC signaling or a MAC control unit in the RRC connection information.

On the basis of the embodiment shown in FIG. 21, a third receiving module 171 may be configured to receive second access parameter information transmitted by the base station by a PDCCH order. The second access parameter information includes an uplink coverage level (a number of repetitions) and a downlink coverage level of the UE, or the second access parameter information includes the uplink coverage level (the number of repetitions) and the number of physical layer repetitions of the PDCCH of the UE, or the second access parameter information includes the uplink coverage level (the number of repetitions) of the UE.

Figure 24:
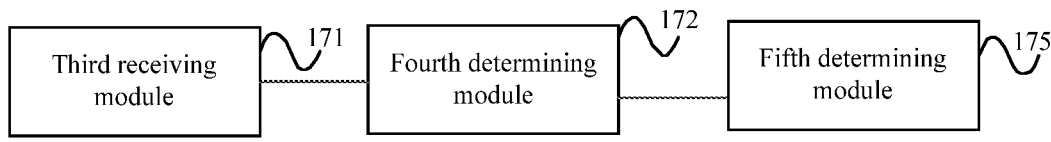
FIG. 24 is a structural diagram of a wireless resource configuration device according to embodiment twelve of the present disclosure.

FIG. 24 is a structural diagram of a wireless resource configuration device according to embodiment twelve of the present disclosure. As shown in FIG. 24, the wireless resource configuration device of this embodiment on the basis of FIG. 21 may also include:

a fifth determining module 175, which is configured to determine according to a downlink coverage level of the UE in second access parameter information, to receive a set of a number of physical layer repetitions of a PDCCH transmitted by a base station, or determine, according to the number of physical layer repetitions of the PDCCH in the second access parameter information, to receive the set of the number of physical layer repetitions of the PDCCH transmitted by the base station, or determine, according to an uplink coverage level (a number of repetitions) in the second access parameter information, a coverage level of the PDCCH, and add an offset to the coverage level, and determine, according to the offset coverage level, the set of the number of physical layer repetitions of the PDCCH transmitted by the base station.

Figure 25:
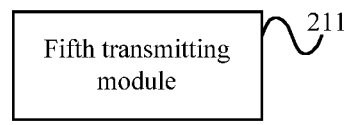
FIG. 25 is a structural diagram of a wireless resource configuration device according to embodiment thirteen of the present disclosure.

FIG. 25 is a structural diagram of a wireless resource configuration device according to embodiment thirteen of the present disclosure. As shown in FIG. 25, the wireless resource configuration device in this embodiment includes:

a fifth transmitting module 211, which is configured to broadcast third access parameter information. The third access parameter information includes a parameter related to a UE power class. The parameter related to the UE power class includes at least one of: a wireless coverage level threshold for UE power class, a PRACH parameter for the UE power class, or a maximum number of physical layer repetitions of the PDCCH of bearer paging scheduling information for the UE power class.

On the basis of the embodiment shown in FIG. 25, if the parameter related to the UE power class includes the wireless coverage level threshold for the UE power class, the number of the wireless coverage level thresholds corresponding to different power classes is same or different.

On the basis of the embodiment shown in FIG. 25, if the parameter related to the UE power class includes the wireless coverage level threshold for the UE power class and a PRACH parameter for the UE power class, the PRACH parameter corresponding to different UE power class is matched with the number of the wireless coverage level thresholds.

On the basis of the embodiment shown in FIG. 25, if the parameter related to the UE power class includes the wireless coverage level threshold for the UE power class and does not include the PRACH parameter for the UE power class, a number of sets of PRACH parameters is matched with a maximum value of the number of the wireless coverage level thresholds.

On the basis of the embodiment shown in FIG. 25, if the parameter related to the UE power class includes the PRACH parameter for the UE power class and the base station provides a multi-carrier cell, the PRACH parameter corresponding to different UE power class is configured on a same carrier or different carriers.

On the basis of the embodiment shown in FIG. 25, if the parameter related to the UE power class includes the maximum number of physical layer repetitions of the PDCCH of the bearer paging scheduling information for the UE power class, the base station determines, based on the UE power class, the maximum number of physical layer repetitions of the PDCCH of the bearer paging scheduling information.

When the base station transmits a paging message to the UE, the number of physical layer repetitions of the PDCCH of the bearer paging scheduling information does not exceed the maximum number of physical layer repetitions of the PDCCH of the bearer paging scheduling information.

In the embodiment shown in FIG. 25, the UE power class is carried on UE power class information carried in a paging message transmitted by a mobility management entity (MME).

Figure 26:
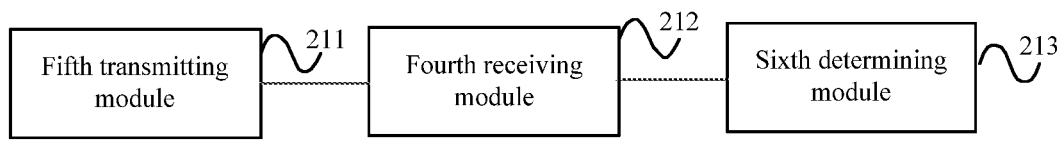
FIG. 26 is a structural diagram of a wireless resource configuration device according to embodiment fourteen of the present disclosure.

FIG. 26 is a structural diagram of a wireless resource configuration device according to embodiment fourteen of the present disclosure. As shown in FIG. 26, the wireless resource configuration device of this embodiment on the basis of FIG. 25 may also include:

a fourth receiving module 212, which is configured to receive PRACH preamble information transmitted by the UE;

a sixth determining module 213, which is configured to determine, according to a resource used for transmitting the PRACH preamble information, a wireless coverage level of the UE; and determine to transmit a number of physical layer repetitions of the PDCCH according to the wireless coverage level of the UE.

On the basis of the embodiment shown in FIG. 26, the sixth determining module 213 may be further configured to determine, according to the resource used for transmitting the PRACH preamble information, determine a UE power class.

Figure 27:
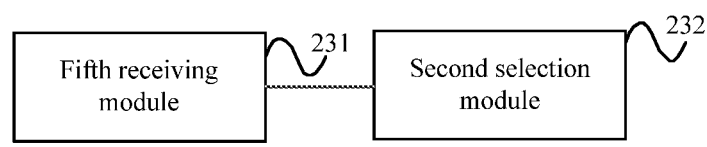

FIG. 27 is a structural diagram of a wireless resource configuration device according to embodiment fifteen of the present disclosure. As shown in FIG. 27, the wireless resource configuration device in this embodiment includes:

a fifth receiving module 231, which is configured to receive third access parameter information broadcast by a base station; where the third access parameter information includes a parameter related to a UE power class, the parameter related to the UE power class includes at least one of: a wireless coverage level threshold for UE power class, a PRACH parameter for the UE power class, or a maximum number of physical layer repetitions of the PDCCH of bearer paging scheduling information for the UE power class;

a second selection module 232, which is configured to select an access parameter corresponding to the UE power class of the UE in the third access parameter information.

On the basis of the embodiment shown in FIG. 27, the second selection module 232 may be configured to select, according to the UE power class of the UE, if the parameter related to the UE power class includes the wireless coverage level threshold for the UE power class, the wireless coverage level threshold used by the UE in the wireless coverage level threshold for the UE power class; otherwise, the UE uses the wireless coverage level threshold of the cell in which the UE is located as the wireless coverage level threshold used by the UE.

On the basis of the embodiment shown in FIG. 27, the second selection module 232 may further be configured to compare a wireless coverage measurement value with the wireless coverage level threshold used by the UE to obtain a wireless coverage level of the UE.

Figure 28:
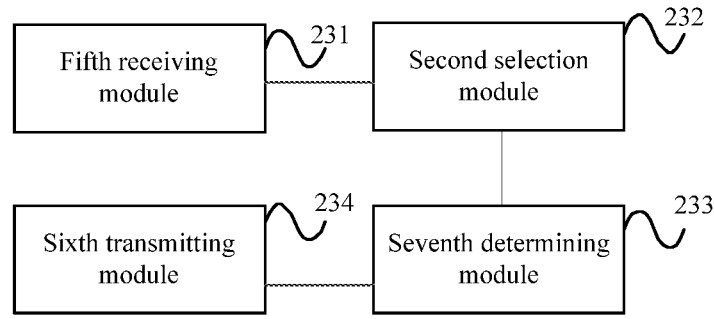
FIG. 28 is a structural diagram of a wireless resource configuration device according to embodiment sixteen of the present disclosure.

FIG. 28 is a structural diagram of a wireless resource configuration device according to embodiment sixteen of the present disclosure. As shown in FIG. 28, the wireless resource configuration device of this embodiment on the basis of FIG. 27 may also include:

a seventh determining module 233, which is configured to determine, according to a wireless coverage level, a resource used for PRACH; and a sixth transmitting module 234, which is configured to use the resource to transmit PRACH preamble information to a base station, and enable the base station to determine, according to the resource used for transmitting the PRACH preamble information, the wireless coverage level of UE.

On the basis of the embodiment shown in FIG. 27, a second selection module 232 may be configured to select, according to a UE power class, if a parameter related to the UE power class includes a PRACH parameter for UE power class, the PRACH parameter used by the UE in the PRACH parameter for UE power class; otherwise, the UE uses the PRACH parameter of the cell in which the UE is located as the PRACH parameter used by the UE.

On the basis of the embodiment shown in FIG. 27, if the cell in which the UE is located is a multi-carrier cell and the PRACH parameter corresponding to a different UE power class is configured on a different carrier, the second selection module 232 may be configured to select the PRACH carrier carrying the UE based on the UE power class of the UE and the number of PRACH carrier carrying the UE power class of the UE, and take the PRACH parameter of the PRACH carrier carrying the UE as the PRACH parameter used by the UE.

On the basis of the embodiment shown in FIG. 27, the second selection module 232 may further be configured to determine, according to the UE power class of the UE, if the parameter related to the UE power class includes the maximum number of physical layer repetitions of the PDCCH of the bearer paging scheduling information for the UE power class, the maximum number of physical layer repetitions of the PDCCH of the bearer paging scheduling information; and determine, according to the maximum number of physical layer repetitions of the PDCCH of the bearer paging scheduling information, a search space of a paging message.

Figure 29:
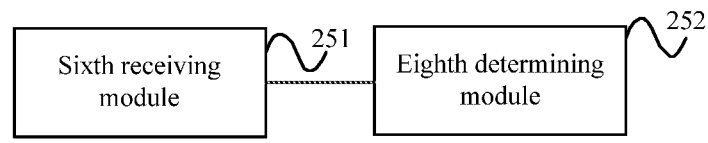
FIG. 29 is a structural diagram of a wireless resource configuration device according to embodiment seventeen of the present disclosure.

FIG. 29 is a structural diagram of a wireless resource configuration device according to embodiment seventeen of the present disclosure. As shown in FIG. 29, the wireless resource configuration device in this embodiment includes:

a sixth receiving module 251, which is configured to receive radio resource control (RRC) connection information transmitted by UE, where the RRC connection information includes UE power class information, where the UE power class information includes a UE power class value or indication information on whether the UE is low power class UE; and an eighth determining module 252, which is configured to determine a UE power class according to the UE power class information.

Figure 30:
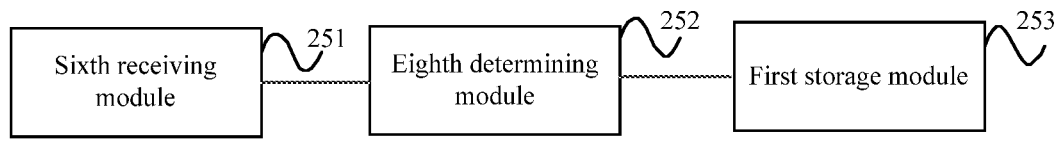
FIG. 30 is a structural diagram of a wireless resource configuration device according to embodiment eighteen of the present disclosure.

FIG. 30 is a structural diagram of a wireless resource configuration device according to embodiment eighteen of the present disclosure. As shown in FIG. 30, the wireless resource configuration device of this embodiment on the basis of FIG. 29 may also include: a first storage module 253, which is configured to store a UE power class.

On the basis of the embodiment shown in FIG. 30, the first storage module 253 may be configured to read, when a sixth receiving module 251 receives a RRC connection request, or a RRC connection resume request, or a RRC connection reestablishment request transmitted by UE, the stored UE power class.

On the basis of the embodiment shown in FIG. 29 or FIG. 30, an eighth determining module 252 may be configured to determine, according to the UE power class, to transmit a number of physical layer repetitions of a PDCCH to the UE.

On the basis of the embodiment shown in FIG. 29 or FIG. 30, the RRC connection information may include at least one of: RRC connection request information, RRC connection resume request information, or RRC connection reestablishment request information.

Figure 31:
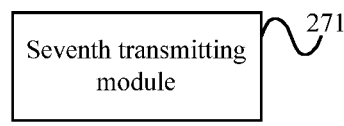
FIG. 31 is a structural diagram of a wireless resource configuration device according to embodiment nineteen of the present disclosure.

FIG. 31 is a structural diagram of a wireless resource configuration device according to embodiment nineteen of the present disclosure. As shown in FIG. 31, the wireless resource configuration device in this embodiment includes:

a seventh transmitting module 271, which is configured to transmit radio resource control (RRC) connection information to a base station, where the RRC connection information includes UE power class information, where the UE power class information includes a UE power class value or indication information on whether the UE is low power class UE.

On the basis of the embodiment shown in FIG. 31, the RRC connection information includes at least one of: RRC connection request information, RRC connection resume request information, RRC connection reestablishment request information, RRC connection establishment complete, RRC connection resume complete, RRC connection reestablishment complete or UE capability information.

Moreover, the present disclosure further provides a computer-readable medium, which is configured to store a wireless resource configuration program which, when executed by a processor, the wireless resource configuration program is configured to implement steps of the wireless resource configuration method described in any one of the embodiments.

It should be understood by those skilled in the art that the embodiments of the present disclosure may be provided as methods, systems or computer program products. Therefore, the present disclosure may adopt a mode of a hardware embodiment, a software embodiment, or a combination of hardware and software embodiment. Moreover, the present disclosure may adopt a form of a computer program product implemented on one or more computer-usable storage media (including, but not limited to, a disk memory, an optical memory and the like) which include computer-usable program codes.

The present disclosure is described with reference to flowcharts and/or block diagrams of methods, apparatuses (systems) and computer program products according to the embodiments of the present disclosure. It is to be understood that each flow and/or block in the flowcharts and/or block diagrams and a combination of flows and/or blocks in the flowcharts and/or block diagrams are implemented by computer program instructions. These computer program instructions can be provided to a general-purpose computer, a special-purpose computer, an embedded processor or a processor of other programmable data processing apparatus to produce a machine so that instructions executed by a computer or a processor of another programmable data processing apparatus produce a means for implementing the functions specified in one or more flows in the flowcharts and/or one or more blocks in the block diagrams.

These computer program instructions can also be stored in a computer-readable memory which can direct a computer or other programmable data processing devices to operate in a particular manner so that the instructions stored in the computer-readable memory produce a manufactured product including an instruction apparatus. The instruction apparatus implements the functions specified in one or more flows in the flowcharts and/or one or more blocks in the block diagrams.

These computer program instructions can also be loaded onto a computer or other programmable data processing devices so that a series of operation steps are performed on the computer or other programmable devices to produce processing implemented by a computer. Therefore, instructions executed on a computer or other programmable devices provide steps for implementing the functions specified in one or more flows in the flowcharts and/or one or more blocks in the block diagrams.

It will be understood by those skilled in the art that functional modules/units in all or part of the steps of the method, the system and the device disclosed above may be implemented as software, firmware, hardware and appropriate combinations thereof. In the hardware implementation, the division of functional modules/units mentioned in the above description may not correspond to the division of physical components. For example, one physical component may have several functions, or one function or step may be executed jointly by several physical components. Some or all components may be implemented as software executed by processors such as digital signal processors or microcontrollers, hardware, or integrated circuits such as application specific integrated circuits. Such software may be distributed on a computer-readable medium, which may include a computer storage medium (or a non-transitory medium) and a communication medium (or a transitory medium). As is known to those skilled in the art, the term, computer storage medium, includes volatile and nonvolatile, removable and non-removable medium implemented in any method or technology for storing information (such as computer-readable instructions, data structures, program modules or other data). The computer storage medium includes, but is not limited to, a RAM, a ROM, an EEPROM, a flash memory or other memory technologies, a CD-ROM, a digital versatile disc (DVD) or other optical disc storage, a magnetic cassette, a magnetic tape, a magnetic disk storage or other magnetic storage devices, or any other medium used for storing desired information and accessed by a computer. Moreover, as is known to those skilled in the art, the communication medium generally includes computer-readable instructions, data structures, program modules or other data in modulated data signals such as carriers or other transmission mechanisms, and may include any information delivery medium.

The above are only preferred embodiments of the present disclosure and are not intended to limit the scope of the present disclosure.

INDUSTRIAL APPLICABILITY

A wireless resource configuration method and device provided in embodiments of the present disclosure enables low power class UE to acquire a corresponding access parameter, and provides the basic guarantee for communication in the network for the low power class UE.

What is claimed is:

1. A wireless communication method, comprising:
broadcasting, by a base station, information to a user equipment (UE) of a power class supporting a maximum transmit power of 14 dBm,
wherein the information comprises a power offset configured for the power class of the UE and a value indicating a maximum transmit power applicable to a cell that enable the UE to determine an access parameter related to a cell selection criterion S based on the power offset and the maximum transmit power applicable to the cell, wherein, for the cell selection criterion S, a maximum transmit power of the power class supporting the maximum transmit power of 14 dBm applicable to the cell is a sum of the maximum transmit power applicable to the cell and the power offset configured for the power class of the UE.

2. The method of claim 1, comprising:
receiving, by the base station, information about the power class of the UE in capability information of the UE.

3. A wireless communication method, comprising:
receiving, by a user equipment (UE) of a power class supporting a maximum transmit power of 14 dBm, information broadcast by a base station, wherein the information includes a power offset configured for the power class and a value indicating a maximum transmit power applicable to a cell; and
determining, by the UE, an access parameter based on the power offset and the maximum transmit power applicable to the cell, wherein a maximum transmit power of the power class supporting the maximum transmit power of 14 dBm applicable to the cell is a sum of the maximum transmit power applicable to the cell and the power offset configured for the power class of the UE, and wherein the access parameter is used for determining whether a criterion S for cell selection is met.

4. The method of claim 3, comprising:
transmitting, by the UE, information about the power class of the UE in capability information of the UE.

5. The method of claim 3, further comprising:
determining, by the UE, using the criterion S for cell selection, whether a cell fulfills a camp condition to obtain wireless communication service.

6. A wireless communication device, comprising:
a processor, and
a memory including processor executable code, wherein the processor executable code upon execution by the processor configures the processor to:
broadcast information to a user equipment (UE) of a power class supporting a maximum transmit power of 14 dBm, wherein the information comprises a power offset configured the power class of the UE and a value indicating a maximum transmit power applicable to a cell that enable the UE to determine an access parameter related to a cell selection criterion S based on the power offset and the maximum transmit power applicable to the cell, wherein, for the cell selection criterion S, a maximum transmit power of the power class supporting the maximum transmit power of 14 dBm applicable to the cell is a sum of the maximum transmit power applicable to the cell and the power offset configured for the power class of the UE.

7. The device of claim 6, wherein the processor is configured to receive information about the power class of the UE in capability information of the UE.

8. A wireless communication device of a power class supporting a maximum transmit power of 14 dBm, comprising:
a processor, and
a memory including processor executable code, wherein the processor executable code upon execution by the processor configures the processor to:
receive information broadcast by a base station, wherein the information includes a power offset configured for the power class and a value indicating a maximum transmit power applicable to a cell; and
determine an access parameter based on the power offset and the maximum transmit power applicable to the cell, wherein a maximum transmit power of the power class supporting the maximum transmit power of 14 dBm applicable to the cell is a sum of the maximum transmit power applicable to the cell and the power offset configured for the power class of the UE, and wherein the access parameter is used for determining whether a criterion S for cell selection is met.

9. The device of claim 8, wherein the processor is configured to transmit information about the power class of the UE in capability information of the UE.

10. The device of claim 8, wherein the processor executable code upon execution by the processor configures the processor to:
determine, using the criterion S for cell selection, whether a cell fulfills a camp condition to obtain wireless communication service.

11. A non-transitory storage medium having code stored thereon, the code upon execution by a processor, causing the processor to implement a method that comprises:
receiving, by a user equipment (UE) of a power class supporting a maximum transmit power of 14 dBm, information broadcasted by a base station, wherein the information includes a power offset configured for the power class and a value indicating a maximum transmit power applicable to a cell; and
determining, by the UE, an access parameter based on the power offset and the maximum transmit power applicable to the cell, wherein a maximum transmit power of the power class supporting the maximum transmit power of 14 dBm applicable to the cell is a sum of the maximum transmit power applicable to the cell and the power offset configured for the power class of the UE, and wherein the access parameter is used for determining whether a criterion S for cell selection is met.

12. The non-transitory storage medium of claim 11, wherein the method comprises:
    transmitting, by the UE, information about the power class of the UE in capability information of the UE.

13. The non-transitory storage medium of claim 11, wherein the method comprises:
    receiving, by the bases station, information about the power class of the UE in capability information of the UE.

14. The non-transitory storage medium of claim 11, wherein the method further comprises:
    determining, by the UE, using the criterion S for cell selection, whether a cell fulfills a camp condition to obtain wireless communication service.

15. A non-transitory storage medium having code stored thereon, the code upon execution by a processor, causing the processor to implement a method that comprises:
    broadcasting, by a base station, information to a user equipment (UE) of a power class supporting a maximum transmit power of 14 dBm, the information comprises a power offset configured for the power class of the UE and a value indicating a maximum transmit power applicable to a cell that enable the UE to determine an access parameter related to a cell selection criterion S based on the power offset and the maximum transmit power applicable to the cell wherein, for the cell selection criterion S, a maximum transmit power of the power class supporting the maximum transmit power of 14 dBm applicable to the cell is a sum of the maximum transmit power applicable to the cell and the power offset configured for the power class of the UE.

* * * * *

UNITED STATES PATENT AND TRADEMARK OFFICE
CERTIFICATE OF CORRECTION

PATENT NO. : 11,006,455 B2
APPLICATION NO. : 16/274150
DATED : May 11, 2021
INVENTOR(S) : Xiubin Sha et al.

Page 1 of 1

It is certified that error appears in the above-identified patent and that said Letters Patent is hereby corrected as shown below:

In the Specification

In Column 2, Line 30, delete "information." and insert -- information; --, therefor.

In Column 6, Line 10, delete "FIG. 22" and insert -- FIG. 27 --, therefor.

In Column 14, Line 61, delete "defined a" and insert -- defined as a --, therefor.

In Column 16, Line 4, delete "401:" and insert -- S401: --, therefor.

In Column 16, Line 8, delete "402:" and insert -- S402: --, therefor.

In Column 16, Line 10, delete "403:" and insert -- S403: --, therefor.

In Column 23, Line 59, delete "at leat" and insert -- at least --, therefor.

In Column 36, Line 46, delete "or and" and insert -- and/or --, therefor.

Signed and Sealed this
Third Day of August, 2021

Drew Hirshfeld
*Performing the Functions and Duties of the
Under Secretary of Commerce for Intellectual Property and
Director of the United States Patent and Trademark Office*